US010890363B2

(12) United States Patent
Oyagi et al.

(10) Patent No.: US 10,890,363 B2
(45) Date of Patent: *Jan. 12, 2021

(54) REFRIGERANT COMPRESSOR AND REFRIGERATION DEVICE INCLUDING REFRIGERANT COMPRESSOR

(71) Applicant: Panasonic Intellectual Property Management Co., Ltd., Osaka (JP)

(72) Inventors: Shingo Oyagi, Osaka (JP); Yoshinori Ishida, Kyoto (JP); Hirotaka Kawabata, Shiga (JP); Hiroyuki Fukuhara, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 242 days.

This patent is subject to a terminal disclaimer.

(21) Appl. No.: 15/757,934

(22) PCT Filed: Aug. 26, 2016

(86) PCT No.: PCT/JP2016/003910
§ 371 (c)(1),
(2) Date: Mar. 6, 2018

(87) PCT Pub. No.: WO2017/043037
PCT Pub. Date: Mar. 16, 2017

(65) Prior Publication Data
US 2018/0340717 A1 Nov. 29, 2018

(30) Foreign Application Priority Data

Sep. 7, 2015 (JP) ................................. 2015-175281

(51) Int. Cl.
*F01C 21/00* (2006.01)
*F03C 2/00* (2006.01)
(Continued)

(52) U.S. Cl.
CPC .............. *F25B 31/004* (2013.01); *C23C 8/10* (2013.01); *F04B 39/00* (2013.01);
(Continued)

(58) Field of Classification Search
CPC .. F04B 39/00; F04B 39/0261; F04B 39/0292; F16C 33/12; F16C 2360/00;
(Continued)

(56) References Cited

U.S. PATENT DOCUMENTS 3,698,204 A * 10/1972 Schlotterbeck ........ B60H 1/321
62/206
5,087,181 A 2/1992 Kamitsuma et al.
(Continued)

FOREIGN PATENT DOCUMENTS

CN     1186872 A      7/1998
CN     102628154 A    8/2012
(Continued)

OTHER PUBLICATIONS

International Search Report issued for International Patent Application No. PCT/JP2016/003910, dated Nov. 15, 2016, 4 pages including English translation.
(Continued)

*Primary Examiner* — Theresa Trieu
(74) *Attorney, Agent, or Firm* — Hamre, Schumann, Mueller & Larson, P.C.

(57) ABSTRACT

A refrigerant compressor reserves lubricating oil in a sealed container, and accommodates therein an electric component, and a compression component which is driven by the electric component and compresses a refrigerant. At least one of slide members included in the compression component is made of an iron-based material, and an oxide coating film comprising a composition A portion, a composition B portion, and a composition C portion is provided on a slide (Continued)

surface of the iron-based material. The composition A portion is a portion containing diiron trioxide ($Fe_2O_3$) which is more in quantity than other substances, and is, for example, an outermost portion (160*a*). The composition B portion is a portion containing triiron tetraoxide ($Fe_3O_4$) which is more in quantity than other substances and containing a silicon (Si) compound, and is, for example, an intermediate portion (160*b*). The composition C portion is a portion containing triiron tetraoxide ($Fe_3O_4$) which is more in quantity than other substances and containing silicon (Si) which is more in quantity than silicon (Si) of the composition B portion, and is, for example, an inner portion (160*c*).

11 Claims, 12 Drawing Sheets
(1 of 12 Drawing Sheet(s) Filed in Color)

(51) Int. Cl.
*F25B 31/00* (2006.01)
*C23C 8/10* (2006.01)
*F16C 33/12* (2006.01)
*F04B 39/00* (2006.01)
*F04B 39/02* (2006.01)

(52) U.S. Cl.
CPC ...... *F04B 39/0261* (2013.01); *F04B 39/0292* (2013.01); *F16C 33/12* (2013.01); *F05C 2203/08* (2013.01); *F05C 2253/12* (2013.01); *F16C 2360/00* (2013.01)

(58) Field of Classification Search
CPC .... F05C 2203/08; F05C 2253/12; C23C 8/10; F25B 31/004
USPC .................................................. 418/178, 179
See application file for complete search history.

(56) References Cited

U.S. PATENT DOCUMENTS

| | | | |
|---|---|---|---|
| 5,364,248 A * | 11/1994 | Nakashima | F04C 2230/91 418/178 |
| 5,531,574 A | 7/1996 | Honma | |
| 2008/0070060 A1 | 3/2008 | Suzuki et al. | |
| 2009/0269578 A1 | 10/2009 | Takeda et al. | |

FOREIGN PATENT DOCUMENTS

| | | |
|---|---|---|
| CN | 102661263 A | 9/2012 |
| CN | 102661264 A | 9/2012 |
| EP | 1310577 | 5/2003 |
| EP | 2113580 | 11/2009 |
| EP | 2818716 A1 | 12/2014 |
| JP | H0362890 A | 3/1991 |
| JP | H07238885 A | 9/1995 |
| JP | 2007-039780 | 2/2007 |
| JP | 2009263750 A | 11/2009 |
| JP | 2011-012305 | 1/2011 |
| JP | 2013024066 A | 2/2013 |
| WO | 2013125197 A1 | 8/2013 |

OTHER PUBLICATIONS

Office Action issued for Chinese Patent Application No. 201680051856.9, dated Nov. 19, 2018, 11 pages including English translation.
Extended European Search Report, issued in the corresponding European patent application No. 16843907.3, dated Jul. 3, 2018, 7 pages.
Kobe Steel, Ltd Technical Report vol. 55 No. 1 (Apr. 2005), 12 pages including machine translation.

* cited by examiner

Base material side ←  → Outermost surface side

Base material ← → Outermost
       side            surface side

Base material ← → Outermost
       side            surface side

Base material ← → Outermost
       side            surface side

Base material ← → Outermost
side              surface side

REFRIGERANT COMPRESSOR AND REFRIGERATION DEVICE INCLUDING REFRIGERANT COMPRESSOR

TECHNICAL FIELD

The present invention relates to a refrigerant compressor for use with a refrigerator, an air conditioner, or the like, and a refrigeration device including the refrigerant compressor.

BACKGROUND ART

In recent years, for the purpose of global environment conservation, a refrigerant compressor with a higher efficiency, which can reduce the use of fossil fuel, has been developed.

One approach for achievement of the higher efficiency of the refrigerant compressor is, for example, formation of a phosphate coating film on a slide surface of a slide section such as a piston or a crankshaft to prevent abrasion of the slide section. By forming this phosphate coating film, unevenness of the processed surface of a machine processing finish can be removed, and initial conformability between slide members can be improved (e.g., see Patent Literature 1).

FIG. 13 is a cross-sectional view of a conventional refrigerant compressor disclosed in Patent Literature 1. As shown in FIG. 13, a sealed container 1 is an outer casing of the refrigerant compressor. Lubricating oil 2 is reserved in the bottom portion of the sealed container 1. The sealed container 1 accommodates therein an electric component 5 including a stator 3 and a rotor 4, and a reciprocating compression component 6 driven by the electric component 5.

The compression component 6 includes a crankshaft 7, a cylinder block 11, a piston 15, and the like. The configuration of the compression component 6 will be described below.

The crankshaft 7 includes at least a main shaft section 8 to which the rotor 4 is pressingly secured, and an eccentric shaft 9 which is provided eccentrically with the main shaft section 8. The crankshaft 7 is provided with an oil feeding pump 10.

The cylinder block 11 forms a compression chamber 13 including a bore 12 with a substantially cylindrical shape and includes a bearing section 14 supporting the main shaft section 8.

The piston 15 is loosely fitted into the bore 12 with a clearance. The piston 15 is coupled to the eccentric shaft 9 via a connecting rod 17 as a coupling means by use of a piston pin 16. The end surface of the bore 12 is closed by a valve plate 18.

A head 19 is secured to the valve plate 18 on a side opposite to the bore 12. The head 19 constitute a high-pressure chamber. A suction tube 20 is secured to the sealed container 1 and connected to a low-pressure side (not shown) of a refrigeration cycle. The suction tube 20 leads a refrigerant gas (not shown) to the inside of the sealed container 1. A suction muffler 21 is retained between the valve plate 18 and the head 19.

The main shaft section 8 of the crankshaft 7 and the bearing section 14, the piston 15 and the bore 12, the piston pin 16 and the connecting rod 17, the eccentric shaft 9 of the crankshaft 7 and the connecting rod 17 constitute slide sections.

In a combination of the iron-based materials among the slide members constituting the slide sections, as described above, an insoluble phosphate coating film comprising a porous crystalline body is provided on the slide surface of one of the iron-based materials.

Next, the operation of the sealed compressor having the above-described configuration will be described. Electric power is supplied from a power supply utility (not shown) to the electric component 5, to rotate the rotor 4 of the electric component 5. The rotor 4 rotates the crankshaft 7. By an eccentric motion of the eccentric shaft 9, the piston 15 is driven via the connecting rod 17 as a coupling means and the piston pin 16. The piston 15 reciprocates inside the bore 12. By the reciprocating motion of the piston 15, a refrigerant gas is led to the inside of the sealed container 1 through the suction tube 20, suctioned from the suction muffler 21 into the compression chamber 13, and compressed inside the compression chamber 13 in succession.

According to the rotation of the crankshaft 7, the lubricating oil 2 is fed to the slide sections by the oil feeding pump 10, and lubricates each of the slide sections. In addition, the lubricating oil 2 serves to seal a gap formed between the piston 15 and the bore 12.

The main shaft section 8 of the crankshaft 7 and the bearing section 14 perform a rotation. While the refrigerant compressor is stopped, a rotational speed is 0 m/s. During start-up of the refrigerant compressor, the rotation starts in a state in which the metals are in contact with each other, and a great frictional resistance force is generated. In this refrigerant compressor, the phosphate coating film is provided on the main shaft section 8 of the crankshaft 7, and has an initial conformability. In this structure, the phosphate coating film can prevent an abnormal abrasion caused by the contact between the metals during start-up of the refrigerant compressor.

CITATION LIST

Patent Literature

Patent Literature 1: Japanese-Laid Open Patent Application Publication No. Hei. 7-238885

SUMMARY OF INVENTION

Technical Problem

In recent years, to provide higher efficiency of the refrigerant compressor, the lubricating oil 2 with a lower viscosity is used, or a slide length of the slide sections (a distance for which the slide sections slide) is designed to be shorter. For this reason, the conventional phosphate coating film is likely to be abraded or worn out at earlier time and it may be difficult to maintain the conformability between the slide surfaces. As a result, the abrasion resistance of the phosphate coating film may be degraded.

In the refrigerant compressor, while the crankshaft 7 is rotating once, a load applied to the main shaft section 8 of the crankshaft 7 is significantly changed. With this change in the load, the refrigerant gas dissolved into the lubricating oil 2 is evaporated into bubbles, in a region between the crankshaft 7 and the bearing section 14. The bubbles cause an oil film to run out, and the contact between the metals occurs more frequently.

As a result, the phosphate coating film provided on the main shaft section 8 of the crankshaft 7 is likely to be abraded at earlier time and a friction coefficient is likely to be increased. With the increase in the friction coefficient, the slide section generates more heat, and thereby abnormal abrasion such as adhesion may occur. A similar phenomenon may occur in the region between the piston 15 and the bore 12. Therefore, the piston 15 and the bore 12 have the same problem as that occurring in the crankshaft 7.

The present invention has been developed to solve the above described problem associated with the prior art, and an object of the present invention is to provide a refrigerant compressor which can improve an abrasion resistance of a slide member, to realize high reliability and high efficiency, and a refrigeration device including the refrigerant compressor.

Solution to Problem

To achieve the above-described object, there is provided a refrigerant compressor which reserves lubricating oil in a sealed container, and accommodates therein an electric component, and a compression component which is driven by the electric component and compresses a refrigerant, wherein at least one of slide members included in the compression component is made of an iron-based material, and wherein an oxide coating film is provided on a slide surface of the iron-based material, the oxide coating film comprising: a composition A portion containing diiron trioxide ($Fe_2O_3$) which is more in quantity than other substances; a composition B portion containing triiron tetraoxide ($Fe_3O_4$) which is more in quantity than other substances and containing a silicon (Si) compound; and a composition C portion containing triiron tetraoxide ($Fe_3O_4$) which is more in quantity than other substances and containing silicon (Si) which is more in quantity than silicon (Si) of the composition B portion.

In accordance with this configuration, the abrasion resistance of the slide member can be improved (increased), and the adhesivity of the oxide coating film can be improved. This makes it possible to prevent abnormal abrasion (adhesion abrasion) which would occur due to, for example, adhesion between the slide members constituting the slide sections. Therefore, the viscosity of lubricating oil can be reduced, and the slide length of slide members (a distance for which the slide members slide) constituting the slide sections can be designed to be shorter. Since a sliding loss of the slide section can be reduced, the refrigerant compressor can improve reliability, efficiency, and performance.

To solve the above-described problem, a refrigerant compressor of the present invention comprises a refrigerant circuit including the refrigerant compressor having the above-described configuration, a heat radiator, a pressure reducing unit, and a heat absorber, which are annularly coupled to each other via a pipe.

In accordance with this configuration, the refrigeration device includes the refrigerant compressor with higher efficiency. Therefore, electric power consumption of the refrigeration device can be reduced, and energy saving can be realized.

The above and further objects, features and advantages of the present invention will more fully be apparent from the following detailed description of preferred embodiments with reference to accompanying drawings.

Advantageous Effects of Invention

The present invention has advantages in that with the above described configuration, it becomes possible to provide a refrigerant compressor which can improve an abrasion resistance of a slide member, to realize high reliability and high efficiency, and a refrigeration device including the refrigerant compressor.

BRIEF DESCRIPTION OF DRAWINGS

The patent or application file contains at least one drawing executed in color. Copies of this patent or patent application publication with color drawing(s) will be provided by the Office upon request and payment of the necessary fee.

DESCRIPTION OF EMBODIMENTS

Figure 1:
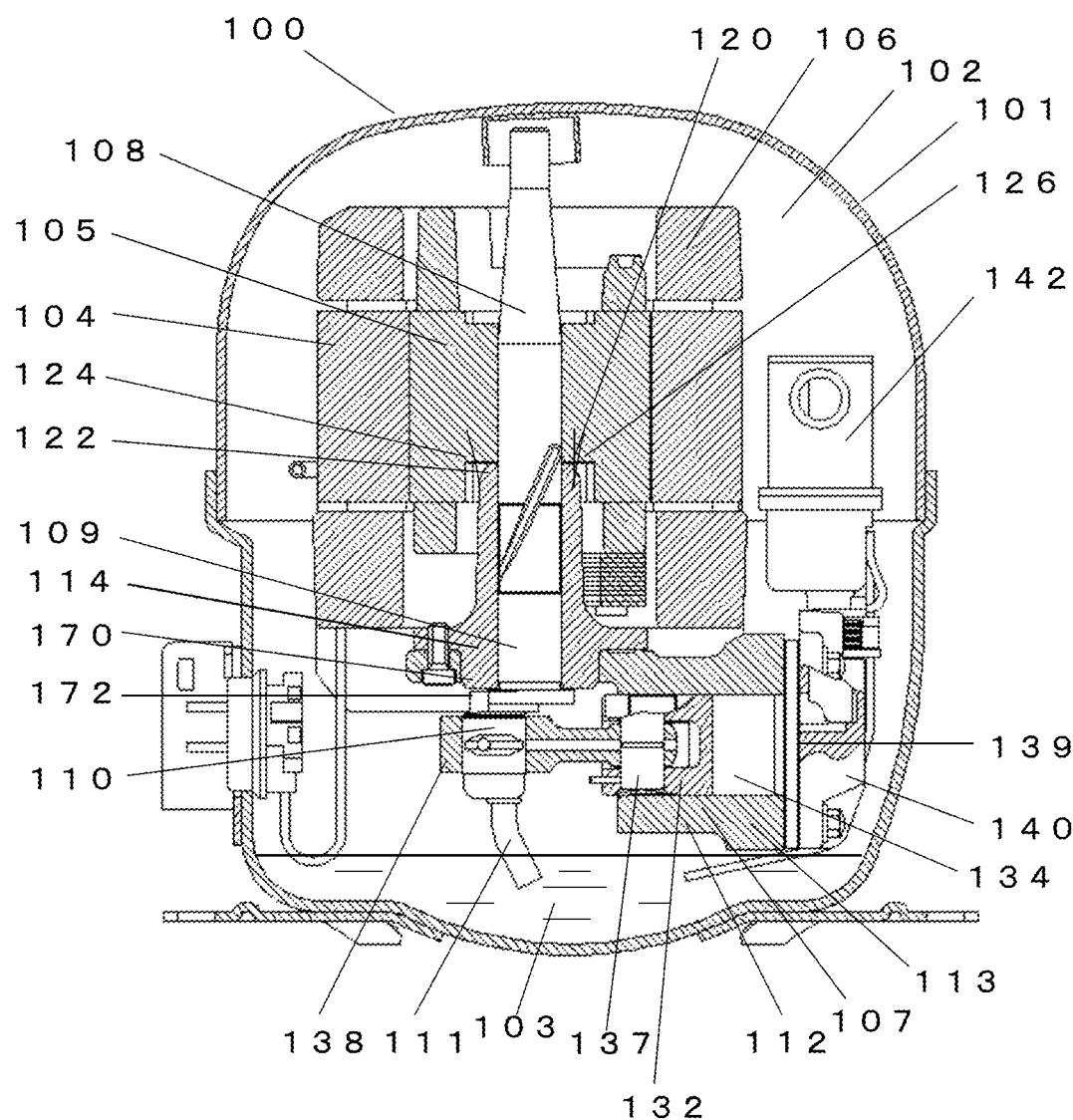
FIG. 1 is a schematic cross-sectional view of a refrigerant compressor according to Embodiment 1 of the present disclosure.

According to the present disclosure, there is provided refrigerant compressor which reserves lubricating oil in a sealed container, and accommodates therein an electric component, and a compression component which is driven by the electric component and compresses a refrigerant, wherein at least one of slide members included in the compression component is made of an iron-based material, and wherein an oxide coating film is provided on a slide surface of the iron-based material, the oxide coating film comprising: a composition A portion containing diiron trioxide ($Fe_2O_3$) which is more in quantity than other substances; a composition B portion containing triiron tetraoxide ($Fe_3O_4$) which is more in quantity than other substances and containing a silicon (Si) compound; and a composition C portion containing triiron tetraoxide ($Fe_3O_4$) which is more in quantity than other substances and containing silicon (Si) which is more in quantity than silicon (Si) of the composition B portion.

In accordance with this configuration, the abrasion resistance of the slide member can be improved, and the adhesivity of the oxide coating film can be improved. This makes it possible to prevent abnormal abrasion (adhesion abrasion) which would occur due to, for example, adhesion between the slide members constituting the slide sections. Therefore, the viscosity of lubricating oil can be reduced, and the slide length of slide members (a distance for which the slide members slide) constituting the slide sections can be designed to be shorter. Since a sliding loss of the slide section can be reduced, the refrigerant compressor can improve reliability, efficiency and performance.

In the refrigerant compressor having the above-described configuration, the oxide coating film may comprise at least an outermost portion which is the composition A portion, an intermediate portion which is the composition B portion, and an inner portion which is the composition C portion, the outermost portion, the intermediate portion, and the inner portion being arranged in this order from the outermost surface.

In this configuration, since the composition A portion is located in the outermost surface of the slide member, the outermost surface contains more diiron trioxide ($Fe_2O_3$) which is relatively hard and flexible in crystal structure. This makes it possible to suppress the attacking characteristic of the slide member with respect to the other member and improve conformability at an initial stage of sliding. As a result, reliability of the refrigerant compressor can be improved.

In the refrigerant compressor having the above-described configuration, the oxide coating film may be provided on a surface of a base material made of the iron-based material, and the composition A portion may contain the silicon (Si) compound.

In this configuration, a number of silicon (Si) compounds such as silicon oxides which are very hard are present in the composition A portion. This makes it possible to form the oxide coating film which is more firm (stronger) while maintaining the advantages obtained by diiron trioxide ($Fe_2O_3$) contained in the composition A portion such that diiron trioxide ($Fe_2O_3$) is more in quantity than other substances. Therefore, even in a case where the slide members slide under a sliding condition in which a load is high, the refrigerant compressor can maintain high reliability.

In the refrigerant compressor having the above-described configuration, the silicon (Si) compound contained in the oxide coating film may be at least one of silicon dioxide ($SiO_2$) and fayalite ($Fe_2SiO_4$).

In this configuration, at least any one of the composition A portion, the composition B portion, and the composition C portion contains a harder region. This makes it possible to further improve (increase) the abrasion resistance of the oxide coating film, and improve the adhesivity between the iron-based material (base material) and the oxide coating film. As a result, the oxide coating film provided on the surface of the slide member can have a higher bearing force, and hence reliability of the refrigerant compressor can be improved.

In the refrigerant compressor having the above-described configuration, the oxide coating film may have a thickness in a range of 1 to 5 µm.

In this configuration, since the abrasion resistance of the oxide coating film can be improved, long-time reliability of the oxide coating film can be improved. In addition, since dimension accuracy of the oxide coating film can be stabilized, productivity of the slide member can be increased.

In the refrigerant compressor having the above-described configuration, the iron-base material may contain 0.5 to 10% silicon.

In this configuration, since the adhesivity of the oxide coating film to the iron-based material (base material) can be further improved, the bearing force of the oxide coating film can be further increased. As a result, reliability of the refrigerant compressor can be further improved.

In the refrigerant compressor having the above-described configuration, the iron-based material may be cast iron.

Since cast iron is inexpensive and has a high productivity, cost of the slide member can be reduced. Since the adhesivity of oxide coating film to the iron-based material (base material) can be further improved, the bearing force of the oxide coating film can be further increased. As a result, reliability of the refrigerant compressor can be further improved.

In the refrigerant compressor having the above-described configuration, the refrigerant may be a HFC-based refrigerant such as R134a, or a mixed refrigerant of the HFC-based refrigerant, and the lubricating oil may be one of ester oil, alkylbenzene oil, polyvinyl ether, and polyalkylene glycol, or mixed oil including any of ester oil, alkylbenzene oil, polyvinyl ether, and polyalkylene glycol.

Even in a case where the lubricating oil with a low viscosity is used, an abnormal abrasion of the slide member can be prevented. In addition, a sliding loss of the slide member can be reduced. Therefore, reliability and efficiency of the refrigerant compressor can be improved.

In the refrigerant compressor having the above-described configuration, the refrigerant may be a natural refrigerant such as R600a, R290, or R744, or a mixed refrigerant including any of the natural refrigerants, and the lubricating oil may be one of mineral oil, ester oil, alkylbenzene oil, polyvinyl ether, and polyalkylene glycol, or mixed oil including any of mineral oil, ester oil, alkylbenzene oil, polyvinyl ether, and polyalkylene glycol.

Even in a case where the lubricating oil with a low viscosity is used, an abnormal abrasion of the slide member can be prevented. In addition, a sliding loss of the slide member can be reduced. Therefore, reliability and efficiency of the refrigerant compressor can be improved. Further, by use of the refrigerant which produces less greenhouse effect, global warming can be suppressed.

In the refrigerant compressor having the above-described configuration, the refrigerant may be a HFO-based refrigerant such as R1234yf, or a mixed refrigerant of the HFO-based refrigerant, and the lubricating oil may be one of ester oil, alkylbenzene oil, polyvinyl ether, and polyalkylene glycol, or mixed oil including ester oil, alkylbenzene oil, polyvinyl ether, and polyalkylene glycol.

Even in a case where the lubricating oil with a low viscosity is used, an abnormal abrasion of the slide member can be prevented. In addition, a sliding loss of the slide member can be reduced. Therefore, reliability and efficiency of the refrigerant compressor can be improved. Further, by use of the refrigerant which produces less greenhouse effect, global warming can be suppressed.

In the refrigerant compressor having the above-described configuration, the electric component may be inverter-driven at one of a plurality of operating frequencies.

During a low-speed operation (running) in which oil is not sufficiently fed to the slide sections, the oxide coating film with a high abrasion resistance can improve reliability. Also, during a high-speed operation (running) in which the rotational speed of the electric component increases, the oxide coating film with a high abrasion resistance can maintain high reliability. As a result, reliability of the refrigerant compressor can be further improved.

A refrigeration device according to the present disclosure comprises a refrigerant circuit including the refrigerant compressor having the above-described configuration, a heat radiator, a pressure reducing unit, and a heat absorber, which are annularly coupled to each other via a pipe.

In accordance with this configuration, the refrigeration device includes the refrigerant compressor with higher efficiency. Therefore, electric power consumption of the refrigeration device can be reduced, and energy (power) saving can be realized. Further, reliability of the refrigeration device can be improved.

Now, typical embodiments of the present disclosure will be described with reference to the drawings. Throughout the drawings, the same or corresponding components (members) are designated by the same reference symbols, and will not be described in repetition.

Embodiment 1

[Configuration of Refrigerant Compressor]

Figure 2A:
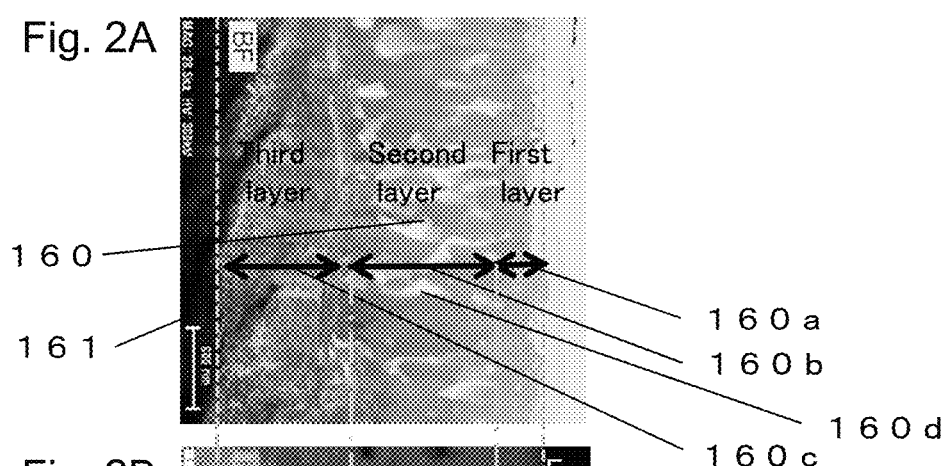
FIG. 2A is a TEM (transmission electron microscope) image showing an example of a result of TEM observation performed for an oxide coating film provided on a slide member of the refrigerant compressor according to Embodiment 1.

Firstly, a typical example of the refrigerant compressor according to Embodiment 1 will be specifically described with reference to FIGS. 1 and 2A. FIG. 1 is a cross-sectional view of a refrigerant compressor 100 according to Embodiment 1. FIG. 2A is a microscope photograph showing an example of a result of TEM (transmission electron microscope) observation performed for a slide member of the refrigerant compressor 100.

As shown in FIG. 1, in the refrigerant compressor 100, a refrigerant gas 102 comprising R134a is filled inside a sealed container 101, and ester oil as lubricating oil 103 is reserved in the bottom portion of the sealed container 101. Inside the sealed container 101, an electric component 106 including a stator 104 and a rotor 105, and a reciprocating compression component 107 configured to be driven by the electric component 106 are accommodated.

The compression component 107 includes a crankshaft 108, a cylinder block 112, a piston 132, and the like. The configuration of the compression component 107 will be described below.

The crankshaft 108 includes at least a main shaft section 109 to which the rotor 105 is pressingly secured, and an eccentric shaft 110 which is provided eccentrically with the main shaft section 109. An oil feeding pump 111 is provided at the lower end of the crankshaft 108 and is in communication with the lubricating oil 103.

The crankshaft 108 comprises a base material 161 made of gray cast iron (FC cast iron) containing about 2% silicon (Si), and an oxide coating film 160 provided on a surface of the base material 161. FIG. 2A shows a typical example of the oxide coating film 160 of Embodiment 1. FIG. 2A shows an example of a result of TEM (transmission electron microscopy) observation performed for the cross-section of the oxide coating film 160 and shows the image of whole of the oxide coating film 160 in a thickness direction.

As shown in FIG. 2A, the oxide coating film 160 according to Embodiment 1 includes an outermost portion 160a as a first layer, an intermediate portion 160b as a second layer, and an inner portion 160c as a third layer, the outermost portion 160a, the intermediate portion 160b, and the inner portion 160c being arranged in this order from the outermost surface of the slide surface. The outermost portion 160a is a composition A portion containing diiron trioxide ($Fe_2O_3$) which is more in quantity than other substances. The intermediate portion 160b is a composition B portion containing triiron tetraoxide ($Fe_3O_4$) which is more in quantity than other substances and containing the silicon (Si) compound. The inner portion 160c is a composition C portion containing triiron tetraoxide ($Fe_3O_4$) which is more in quantity than other substances and containing silicon (Si) which is more in quantity than that of the composition B portion.

The oxide coating film 160 according to Embodiment 1 has a thickness of about 2 μm. The oxide coating film 160 of FIG. 2A is formed on a disc (base material 161) used in a ring on disc abrasion test in Example 1 which will be described later.

The cylinder block 112 comprises cast iron. The cylinder block 112 is formed with a bore 113 with a substantially cylindrical shape, and includes a bearing section 114 supporting the main shaft section 109.

The rotor 105 is provided with a flange surface 120. The upper end surface of the bearing section 114 is a thrust surface 122. A thrust washer 124 is disposed between the flange surface 120 and the thrust surface 122 of the bearing section 114. The flange surface 120, the thrust surface 122, and the thrust washer 124 constitute a thrust bearing 126.

The piston 132 is loosely fitted into the bore 113 with a clearance. The piston 132 comprises an iron-based material. The piston 132 forms a compression chamber 134 together with the bore 113. The piston 132 is coupled to the eccentric shaft 110 via a connecting rod 138 as a coupling means by use of a piston pin 137. The end surface of the bore 113 is closed by a valve plate 139.

A head 140 constitutes a high-pressure chamber. The head 140 is secured to the valve plate 139 on a side opposite to the bore 113. A suction tube (not shown) is secured to the sealed container 101 and connected to a low-pressure side (not shown) of a refrigeration cycle. The suction tube leads the refrigerant gas 102 to the inside of the sealed container 101. A suction muffler 142 is retained between the valve plate 139 and the head 140.

The operation of the refrigerant compressor 100 configured as described above will be described below.

Electric power supplied from a power supply utility (not shown) is supplied to the electric component 106, and rotates the rotor 105 of the electric component 106. The rotor 105 rotates the crankshaft 108. An eccentric motion of the eccentric shaft 110 is transmitted to the piston 132 via the connecting rod 138 as the coupling means and the piston pin 137, and drives the piston 132. The piston 132 reciprocates inside the bore 113. The refrigerant gas 102 led to the inside of the sealed container 101 through the suction tube (not shown) is suctioned from the suction muffler 142, and is compressed inside the compression chamber 134.

According to the rotation of the crankshaft 108, the lubricating oil 103 is fed to slide sections by the oil feeding pump 111. The lubricating oil 103 lubricates the slide sections and seals the clearance between the piston 132 and the bore 113. The slide sections are defined as sections (portions) which slide in a state in which a plurality of slide members are in contact with each other in their slide surfaces.

In recent years, to provide higher efficiency of the refrigerant compressor 100, for example, (1) lubricating oil with a lower viscosity is used as the lubricating oil 103 as described above, or (2) the slide length of the slide members (a distance for which the slide members slide) constituting the slide sections is designed to be shorter. For this reason, slide conditions are getting more harsh. Specifically, there is a tendency that the oil film formed between the slide sections is thinner, or difficult to form.

In addition to the above, in the refrigerant compressor 100, the eccentric shaft 110 of the crankshaft 108 is provided eccentrically with the bearing section 114 of the cylinder block 112, and the main shaft section 109 of the crankshaft 108. In this layout, a fluctuating (variable) load which causes a load fluctuation (change) is applied to regions between the main shaft section 109 of the crankshaft 108, the eccentric shaft 110 and the connecting rod 138, due to a gas pressure of the compressed refrigerant gas 102. With the load fluctuation (change), the refrigerant gas 102 dissolved into the lubricating oil 103 is evaporated into bubbles in repetition, in, for example, the region between the main shaft section 109 and the bearing section 114. In this way, the bubbles are generated in the lubricating oil 103.

For the above-described reasons, for example, in the slide sections of the main shaft section 109 of the crankshaft 108 and the bearing section 114, the oil film has run out, and the metals of the slide surfaces contact each other more frequently.

However, the slide section of the refrigerant compressor 100, for example, the slide section of the crankshaft 108 as an example of Embodiment 1 comprises the oxide coating film 160 having the above-described configuration. For this reason, even if the oil film has run out more frequently, the abrasion of the slide surface caused by this can be suppressed over a long period of time.

[Configuration of Oxide Coating Film]

Next, the oxide coating film 160 which can suppress the abrasion of the slide section will be described in more detail with reference to FIGS. 2B to 6, in addition to FIG. 2A.

(Result of EDS Analysis)

Figure 2B:
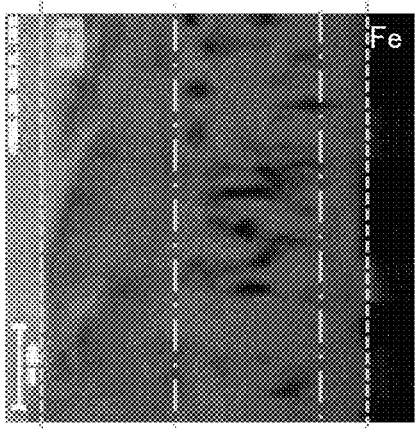
FIGS. 2B to 2D are element maps showing an example of a result of EDS analysis performed for the oxide coating film of FIG. 2A.
Figure 2C:
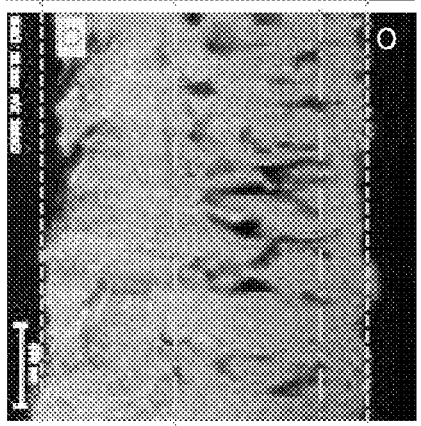
Figure 2D:
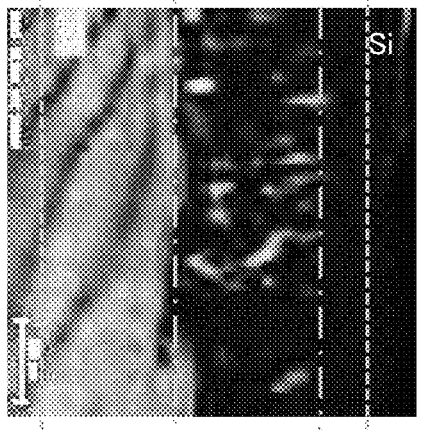

Firstly, the concentration distribution of the elements of the oxide coating film 160 will be described with reference to FIGS. 2A to 2D. FIGS. 2B to 2D are element maps showing an example of a result of EDS (energy dispersive X-ray spectrometry) analysis performed for the cross-section of the oxide coating film 160 of FIG. 2A. FIG. 2B shows the result of element mapping of iron (Fe) of the oxide coating film 160. FIG. 2C shows the result of element mapping of oxygen (O) of the oxide coating film 160. FIG. 2D shows the result of element mapping of silicon (Si) of the oxide coating film 160.

In Embodiment 1, the crankshaft 108 comprises the base material 161 made of gray cast iron (FC cast iron). The oxide coating film 160 is formed on the surface of the base material 161. Specifically, for example, the slide surface of the base material 161 is subjected to polishing finish, and then the oxide coating film 160 is formed by oxidation by use of an oxidation gas.

As described above, in Embodiment 1, as shown in FIG. 2A, the oxide coating film 160 is formed on the base material 161 (on the right side of the base material 161 of FIG. 2A) made of gray cast iron (FC cast iron). It is clearly observed that the oxide coating film 160 has a three-portion structure (three-layer structure) including the outermost portion 160a (first layer), the intermediate portion 160b (second layer), and the inner portion 160c (third layer), the outermost portion 160a, the intermediate portion 160b, and the inner portion 160c being arranged in this order from the outermost surface, as described above. In addition, it is observed that a white portion 160d is present in a part of the intermediate portion 160b as the second layer.

Next, the concentrations of the elements contained in the oxide coating film 160 (namely, element composition of the portions of the oxide coating film 160) will be described with reference to FIGS. 2B to 2D. FIG. 2B shows the result of element mapping of iron (Fe) of the oxide coating film 160. FIG. 2C shows the result of element mapping of oxygen (O) of the oxide coating film 160. FIG. 2D shows the result of element mapping of silicon (Si) of the oxide coating film 160. FIGS. 2B to 2D show concentration ratios of the elements by contrasting density of black and white. As the color of the image is brighter, the ratio of the corresponding element is higher.

In FIG. 2A and FIGS. 2B to 2D, a region surrounded by a pair of broken lines is the oxide coating film 160, the left side is the base material 161, and the right side is the outermost surface. As described above, the thickness of the oxide coating film 160 is about 2 μm. Boundaries of the outermost portion 160a, the intermediate portion 160b, and the inner portion 160c are indicated by dot-and-dash lines.

From the result of the element analysis, it was found out that concentration ratios of iron (Fe), oxygen (O), and silicon (Si) of the oxide coating film 160 have the following trends.

Initially, the trend of the concentration distribution of iron (Fe) will be described with reference to the element mapping result of iron (Fe) of FIG. 2B. As shown in FIG. 2B, over the whole of the oxide coating film 160 (about 2 μm from the surface of the base material 161), a region in which iron (Fe) concentration is lower than that of the base material 161 is formed. Therefore, of course, the concentration of iron (Fe) of the oxide coating film 160 containing the iron oxidation product is lower than that of the base material 161 which is the iron-based material.

In the inside of the oxide coating film 160, there is no significant concentration difference (difference in contrasting density of black and white), in the iron (Fe) concentration distribution in a direction from the outermost surface toward the base material 161. From this, it can be seen that iron (Fe) is basically uniformly distributed in the inside of the oxide coating film 160. As shown in FIG. 2B, in a portion corresponding to the above-described white portion 160d, in the inside of the oxide coating film 160, the iron (Fe) concentration is reduced.

Then, the trend of the concentration distribution of oxygen (O) will be described with reference to the element mapping result of oxygen (O) of FIG. 2C. As shown in FIG. 2C, over the whole of the oxide coating film 160 (about 2 μm from the surface of the base material 161), a region in which oxygen (O) concentration is much higher than that of the base material 161 is formed. It is observed that this oxygen (O) concentration distribution and the iron (Fe) concentration distribution of 2B are formed in almost the same region. Therefore, a portion containing the iron oxidation product as a major component, which is different from the base material 161 as the iron-based material, is formed in the oxide coating film 160.

Regarding the oxygen (O) concentration distribution of the whole of the oxide coating film 160, a significant concentration difference in the whole region from the outermost surface toward the base material 161 is not observed, as in the iron (Fe) concentration distribution. From this, it can be seen that oxygen (O) is basically uniformly distributed in the inside of the oxide coating film 160, as in iron (Fe). As shown in FIG. 2C, in a portion corresponding to the above-described white portion 160d, in the inside of the oxide coating film 160, the oxygen (O) concentration is reduced, as in iron (Fe).

Then, the trend of the concentration distribution of silicon (Si) will be described with reference to the element mapping result of silicon (Si) of FIG. 2D. As shown in FIG. 2D, the silicon (Si) concentration of the base material 161 is high, and the silicon (Si) concentration of the inner portion 160c of the oxide coating film 160 which is closer to the base material 161 is high. In contrast, the silicon (Si) concentration in an interface between the inner portion 160c and the intermediate portion 160b is significantly reduced.

A portion corresponding to the above-described white portion 160d, of the intermediate portion 160b, the silicon (Si) concentration is increased. In the example of FIG. 2D, in the outermost portion 160a, silicon (Si) is not substantially observed.

From the element mapping results of FIGS. 2B to 2D, in the oxide coating film 160, the elements which are iron (Fe) and oxygen (O) are present over the whole region from the outermost portion 160a to the inner portion 160c. However, in the outermost portion 160a, silicon (Si) is not substantially present or less. Also, it is observed that in a part of the intermediate portion 160b and most of the inner portion 160c, silicon (Si) is present.

(Result of EELS Analysis)

Figure 3A:
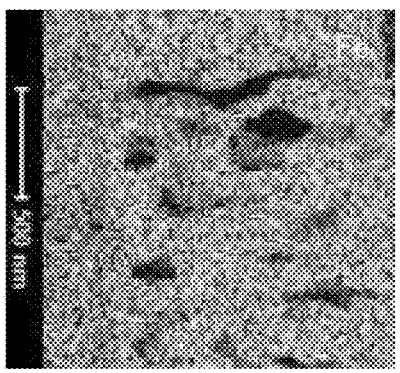
FIGS. 3A to 3C are EELS maps showing an example of a result of EELS analysis performed for the oxide coating film of Embodiment 1.
Figure 3B:
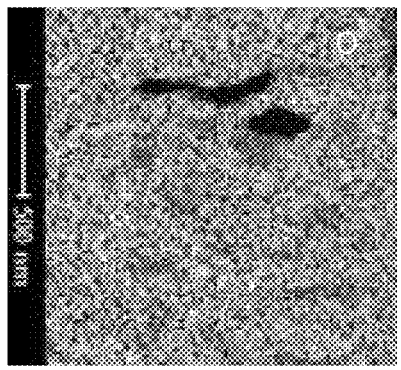
Figure 3C:
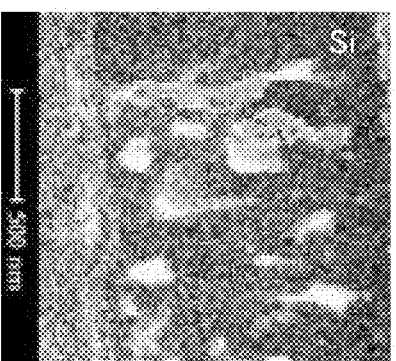
Figure 3D:
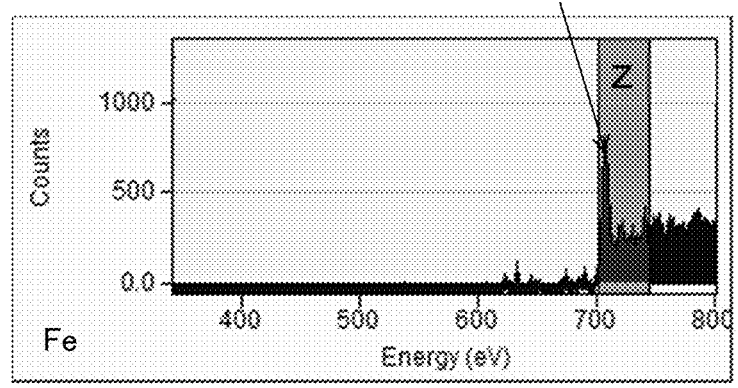
FIGS. 3D to 3F are views of analysis corresponding to the EELS maps of FIGS. 3A to 3C, respectively.
Figure 3E:
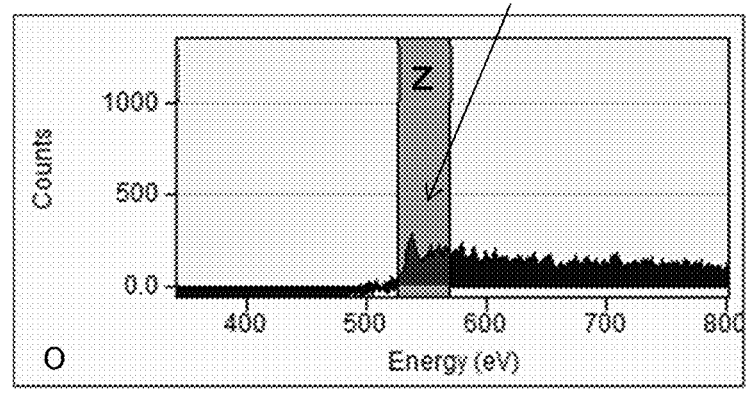
Figure 3F:
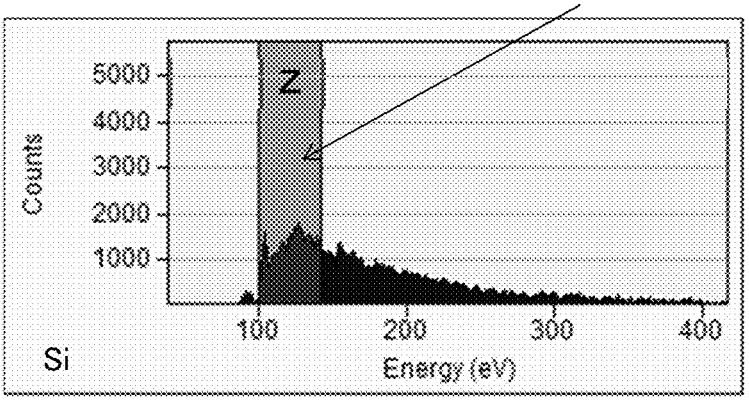

Next, the states of the elements of iron (Fe), oxygen (O), and silicon (Si) will be described more specifically with reference to FIGS. 3A to 3F. FIGS. 3A to 3C show results of element mapping obtained by EELS (electron energy loss spectroscopy) analysis performed for a part of the cross-section of the oxide coating film 160 of FIG. 2A. FIGS. 3D to 3F are views of analysis corresponding to the EELS waveforms of FIGS. 3A to 3C, respectively.

The EELS analysis is a method in which the composition or combined state of a sample is analyzed and evaluated, by measuring energy lost by a mutual action between an electron and an atom when the electron is transmitted through the sample. By the EELS analysis, a particular energy waveform associated with the element or electron structure of the sample can be obtained.

FIG. 3D is an analysis view showing the EELS waveform (mesh region of FIG. 3D) of iron (Fe), of a region of the cross-section of the oxide coating film 160. FIG. 3A shows the element mapping result of iron (Fe) of the region corresponding to FIG. 3D. FIG. 3E is an analysis view showing the EELS waveform (mesh region of FIG. 3E) of oxygen (O), of a region of the cross-section of the oxide coating film 160. FIG. 3B shows the element mapping result of oxygen (O) of the region corresponding to FIG. 3E. FIG. 3F is an analysis view showing the EELS waveform (mesh region of FIG. 3F) of silicon (Si), of a region of the cross-section of the oxide coating film 160. FIG. 3C shows the element mapping result of silicon (Si) of the region corresponding to FIG. 3F.

FIGS. 3A to 3C show the intensities of the EELS waveforms by contrasting density of black and white. As the color of the image is brighter, the ratio of the corresponding EELS waveform is higher.

From the results of the EELS analysis, the intensities of the EELS waveforms (hereinafter will be simply referred to as "waveform intensities") of iron (Fe), oxygen (O), and silicon (Si) of the oxide coating film 160 have the following trends.

Initially, from the result of the EELS analysis of iron (Fe) of FIGS. 3A and 3D, the waveform intensity of iron (Fe) will be described. As shown in FIG. 3A, in the inside of the oxide coating film 160, there is no significant intensity difference in the distribution of the waveform intensity of iron (Fe), from the outermost surface (left side in FIG. 3A) toward the base material 161 (right side in FIG. 3A). From this, it can be seen that iron (Fe) is uniformly distributed over the oxide coating film 160. In a part corresponding to the above-described white portion 160d, the waveform intensity of iron (Fe) is reduced.

Then, from the result of the EELS analysis of oxygen (O) of FIGS. 3B and 3E, the waveform intensity of oxygen (O) will be described. As shown in FIG. 3B, in the inside of the oxide coating film 160, there is no significant intensity difference in the distribution of the waveform intensity of oxygen (O), from the outermost surface (left side in FIG. 3B) toward the base material 161 (right side in FIG. 3B), as in the case of iron (Fe). From this, it can be seen that oxygen (O) is uniformly distributed over the oxide coating film 160, and the oxide coating film 160 entirely comprises iron oxidation product. In a part corresponding to the above-described white portion 160d, the waveform intensity of oxygen (O) is reduced.

Then, from the result of the EELS analysis of silicon (Si) of FIGS. 3C and 3F, the waveform intensity of silicon (Si) will be described. As shown in FIG. 3C, the waveform intensity of silicon (Si) is high in a region (right side in FIG. 3C) which is closer to the base material 161 (right side in FIG. 3C), and is reduced toward the outermost surface (right side in FIG. 3C). The waveform intensity of silicon (Si) is reduced, in the interface between the inner portion 160c and the intermediate portion 160b of the oxide coating film 160 (see FIG. 2D). In a part of the intermediate portion 160b, corresponding to the above-described white portion 160d, the waveform intensity of silicon (S) is increased.

From the results of EELS analysis of FIGS. 3A to 3F, in the oxide coating film 160, the elements which are iron (Fe) and oxygen (O) are present over the whole region from the outermost portion 160a to the inner portion 160c, as in the results of EDS analysis (element mapping results) of FIGS. 2B to 2D. However, in the outermost portion 160a, silicon (Si) is not substantially present or less. Also, it is observed that in a part of the intermediate portion 160b and most of the inner portion 160c, silicon (Si) is present.

(Result of EELS Analysis of Portions of Oxide Coating Film)

Next, the specific configuration of the oxide coating film 160 will be described by further performing the EELS analysis for the outermost portion 160a, the intermediate portion 160b, and the inner portion 160c of the oxide coating film 160. Specifically, the intensity distributions of iron (Fe), oxygen (O), and silicon (Si), and the states of these elements, of the portions of the oxide coating film 160, will be described more specifically with reference to FIGS. 4A to 6.

Figure 4A:
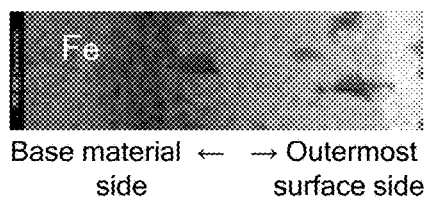
FIG. 4A is an EELS map showing an example of a result of the EELS analysis performed for the outermost portion of the oxide coating film according to Embodiment 1.
Figure 4B:
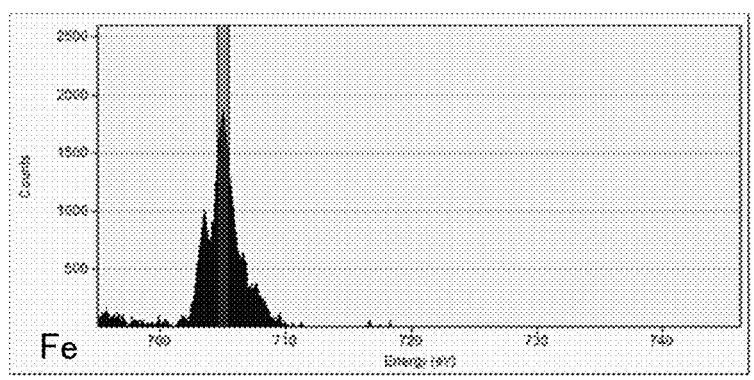
FIG. 4B is a view showing analysis corresponding to the EELS map of FIG. 4A.

FIG. 4B is an analysis view showing an enlarged waveform of a portion corresponding to iron (Fe), of the EELS waveform of the outermost portion 160a of the oxide coating film 160. FIG. 4A shows the result of element mapping of iron (Fe), which conforms to a peak of the enlarged waveform of FIG. 4B, in the cross-section of the oxide coating film 160. The EELS waveform of FIG. 4B is a typical waveform of diiron trioxide ($Fe_2O_3$).

FIG. 3A shows the result of element mapping of the whole of iron (Fe). In FIG. 4A, the intensity distribution of ion (Fe) is not seen. In contrast, as shown in FIG. 4A, the image of the portion which is closer to the outermost surface (left side in FIG. 4A), namely, the outermost portion 160a, is brightest, and therefore the waveform intensity of diiron trioxide ($Fe_2O_3$) is very high. From this, it is seen that the outermost portion 160a contains diiron trioxide ($Fe_2O_3$) which is more in quantity than other substances.

Figure 5A:
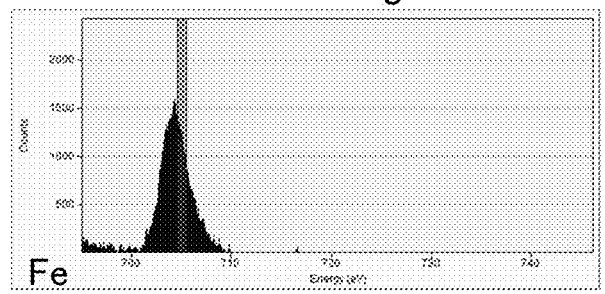
FIGS. 5A to 5E are views of analysis showing an example of a result of EELS analysis performed for the intermediate portion of the oxide coating film according to Embodiment 1.

FIG. 5A is an analysis view showing an enlarged waveform of a portion corresponding to iron (Fe), of the EELS waveform of the intermediate portion 160b of the oxide coating film 160. The EELS waveform of FIG. 5A is a typical waveform of triiron tetraoxide ($Fe_3O_4$). Regarding a portion of the intermediate portion 160b, which is other than the portion corresponding to FIG. 5A, the EELS waveform similar to that of FIG. 5A is observed. Therefore, the intermediate portion 160b contains triiron tetraoxide ($Fe_3O_4$) which is more in quantity than other substances.

Figure 5B:
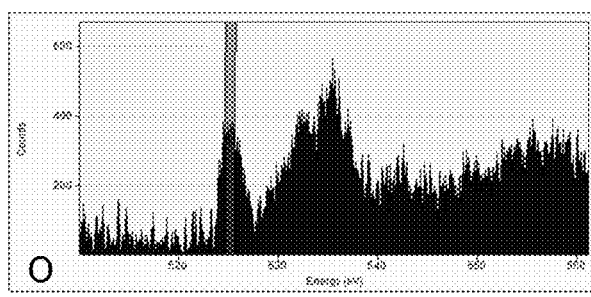
Figure 5C:
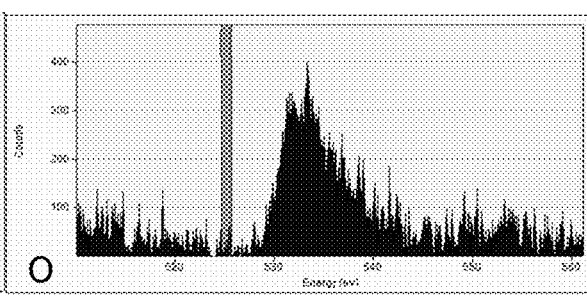

FIGS. 5B and 5C are analysis views showing enlarged waveforms of the same portion corresponding to oxygen (O), of the EELS waveform of the white portion 160d included in the intermediate portion 160b. FIG. 5B shows a peak at a location that is closer to 525 eV. FIG. 5C shows no peak. The peak at a location that is closer to 525 eV is unique to the iron oxidation product. Therefore, it can be seen that oxygen (O) is not bonded to iron (Fe), in a measurement portion of the enlarged waveform of FIG. 5C, namely, the white portion 160d.

Figure 5D:
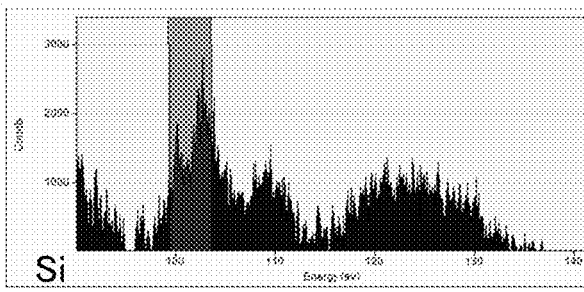
Figure 5E:
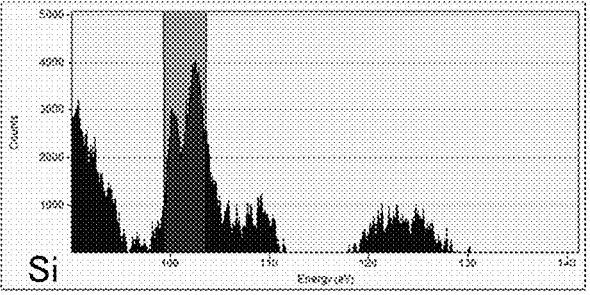

FIGS. 5D and 5E are analysis views showing enlarged waveforms of the same portion corresponding to silicon (Si), of the EELS waveform of the white portion 160d included in the intermediate portion 160b. FIGS. 5B and 5C, and FIGS. 5D and 5E show the EELS waveforms of the same portion. FIGS. 5D and 5E show almost the same EELS waveform. Therefore, in the white portion 160d, silicon (Si) is bonded to oxygen (O).

From a comparison between the EELS waveforms of FIGS. 5B and 5C, and the EELS waveforms of FIGS. 5D and 5E, it is seen that oxygen (O) which is not bonded to iron (Fe) and bonded to silicon (Si), and oxygen (O) bonded to iron (Fe) and silicon (Si) are present in the white portion 160d included in the intermediate portion 160b. Therefore, plural kinds of silicon (Si) compounds having different structures, such as silicon dioxide ($SiO_2$) and fayalite ($Fe_2SiO_4$) are present in the white portion 160d.

Further, the enlarged waveform of the portion corresponding to iron (Fe), of the EELS waveform of a black portion of the inner portion 160c of the oxide coating film 160 has substantially the same shape as that of the enlarged waveform of FIG. 5A, although this is not shown. Therefore, it is seen that the inner portion 160c contains triiron tetraoxide ($Fe_3O_4$) which is more in quantity than other substances, as in the intermediate portion 160b.

Figure 6:
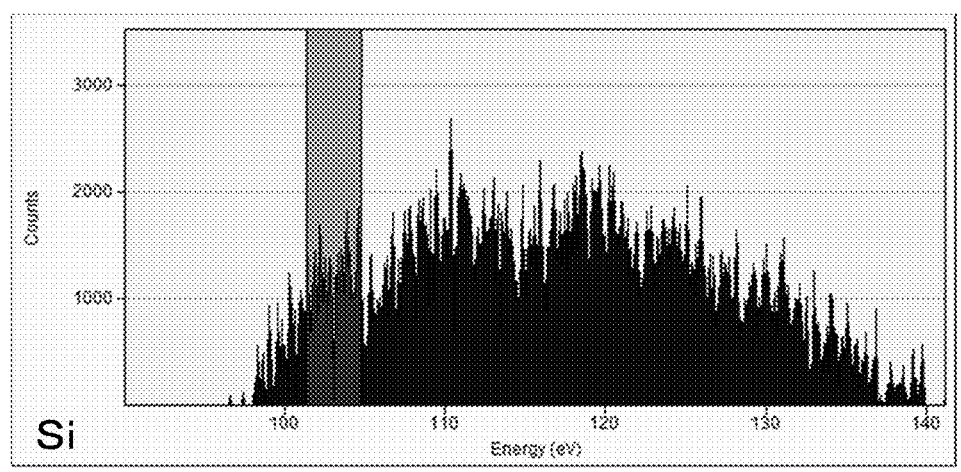
FIG. 6 is a view of analysis showing an example of a result of the EELS analysis performed for the inner portion of the oxide coating film according to Embodiment 1.

FIG. 6 is an analysis view showing an enlarged waveform of a portion corresponding to silicon (Si), of the EELS waveform of the inner portion 160c of the oxide coating film 160. The shape of EELS waveform of FIG. 6 is different from those of the EELS waveform of FIG. 5D and the EELS waveform of FIG. 5E. From the EELS waveform of FIG. 6, in this portion, silicon (Si) is not bonded to oxygen (O). This implies that solid-solved silicon (Si) is present (silicon (Si) is present as elemental substances) in this portion. The waveform similar to the EELS waveform of FIG. 5B and the EELS waveform of FIG. 5D is observed in another portion of the inner portion 160c. Therefore, the silicon (Si) compound and solid-solved silicon (Si) portion are present in the inner portion 160c, as in the intermediate portion 160b.

As described above, the oxide coating film 160 according to the present disclosure includes three portions which are different from each other in composition, which are the composition A portion, the composition B portion, and the composition C portion. Among these, the composition A portion is, for example, the outermost portion 160a containing diiron trioxide ($Fe_2O_3$) which is more in quantity than other substances. The composition B portion is, for example, the intermediate portion 160b containing triiron tetraoxide ($Fe_3O_4$) which is more in quality than other substances and containing the silicon (Si) compound. The composition C portion contains triiron tetraoxide ($Fe_3O_4$) which is more in quality than other substances and contains silicon (Si) which is more in quantity than that of the composition B portion.

As described above, in a typical configuration, the oxide coating film 160 includes at least the outermost portion 160a as the composition A portion, the intermediate portion 160b as the composition B portion, and the inner portion 160c as the composition C portion, the outermost portion 160a, the intermediate portion 160b, and the inner portion 160c being arranged in this order from the outermost surface. However, the configuration of the oxide coating film 160 is not limited to this.

The oxide coating film 160 may include portions which are different in composition from the composition A portion, the composition B portion, and the composition C portion, so long as it includes the composition A portion, the composition B portion, and the composition C portion. The configuration of the oxide coating film 160 is not limited to the configuration in which the composition A portion, the composition B portion, and the composition C portion are stacked in this order from the outermost surface. For example, the configuration of the oxide coating film 160 may be such that the composition B portion, the composition A portion and the composition C portion are stacked in this order from the outermost surface. Thus, the configuration including another portion or the configuration in which the portions are stacked in a different order can be easily realized by adjusting conditions.

As typical example of the conditions, there is a manufacturing method (formation method) of the oxide coating film 160. As the manufacturing method of the oxide coating film 160, a known oxidation method of an iron-based material may be suitably used. The manufacturing method of the oxide coating film 160 is not limited. Manufacturing conditions or the like can be suitably set, depending on the conditions which are the kind of the iron-based material which is the base material 161, its surface state (the above-described polishing finish, etc.), desired physical property of the oxide coating film 160, or the like. In the present disclosure, the oxide coating film 160 can be formed on the surface of the base material 161 by oxidating gray cast iron as the base material 161 within a range of several hundreds degrees C., for example, within a range of 400 to 800 degrees C., by use of a known oxidation gas such as a carbon dioxide gas and known oxidation equipment.

[Evaluation of Oxide Coating Film]

Next, regarding a typical example of the oxide coating film 160 according to Embodiment 1, a result of evaluation of the characteristic of the oxide coating film 160 will be described with reference to FIGS. 7 to 9. Hereinafter, the abrasion suppressing effect of the oxide coating film 160, namely, the abrasion resistance of the oxide coating film 160 will be evaluated, based on results of Example, Prior Art Example, and Comparative Example.

Example 1

As the slide member, a disc made of gray cast iron was used. The base material 161 was gray cast iron. The surface of the disc was the slide surface. As described above, the disc was oxidated within a range of 400 to 800 degrees C., by use of the oxidation gas such as the carbon dioxide gas, to form the oxide coating film 160 according to Embodiment 1 on the slide surface. As shown in FIGS. 2A to 4, the oxide coating film 160 included a first portion 151, a second portion 152, and a third portion 153. In this way, evaluation sample of Example 1 was prepared. The abrasion resistance of the evaluation sample and attacking characteristic of the evaluation sample with respect to the other member (sliding between the evaluation sample and the other member occurred) were evaluated as will be described later.

Prior Art Example 1

As a surface treatment film, the conventional phosphate coating film was formed instead of the oxide coating film 160 according to Embodiment 1. Except this, the evaluation sample of Prior Art Example 1 was prepared as in Example 1. The abrasion resistance of the evaluation sample and attacking characteristic of the evaluation sample with respect to the other member (sliding between the evaluation sample and the other member occurred) were evaluated as will be described later.

Comparative Example 1

As a surface treatment film, a gas nitride coating film which is generally used as a hard film was formed instead of the oxide coating film 160 according to Embodiment 1. Except this, the evaluation sample of Comparative Example 1 was prepared as in Example 1. The abrasion resistance of the evaluation sample and attacking characteristic of the evaluation sample with respect to the other member (sliding between the evaluation sample and the other member occurred) were evaluated as will be described later.

Comparative Example 2

As a surface treatment film, a conventional general oxide coating film, triiron tetraoxide ($Fe_3O_4$) single portion coating film was formed by a method called black oxide coating (fellmight treatment), instead of the oxide coating film 160 according to Embodiment 1. Except this, the evaluation sample of Comparative Example 2 was prepared as in Example 1. The abrasion resistance of the evaluation sample and attacking characteristic of the evaluation sample with respect to the other member (sliding between the evaluation sample and the other member occurred) were evaluated as will be described later.

(Evaluation of Abrasion Resistance and Attacking Characteristic with Respect to the Other Member)

The ring on disc abrasion test was conducted on the above-described evaluation samples in a mixture ambience including T134a refrigerant and ester oil with VG3 (viscosity grade at 40 degrees C. was 3 $mm^2/s$). In addition to discs as the evaluation samples, rings each including a base material made of gray cast iron and having a surface (slide surface) having been subjected to the surface polish, were prepared as the other members (sliding between the evaluation sample and the other member occurred). The abrasion test was conducted under a condition of a load 1000N, by use of intermediate pressure CFC friction/abrasion test machine AFT-18-200M (product name) manufactured by A&D Company, Limited. In this way, the abrasion resistance of the surface treatment film formed on the evaluation sample (disc) and the attacking characteristic of the surface treatment film with respect to the slide surface of the other member (ring) (sliding between the evaluation sample and the other member occurred) were evaluated.

(Comparison Among Example 1, Prior Art Example 1, Comparative Example)

Figure 7:
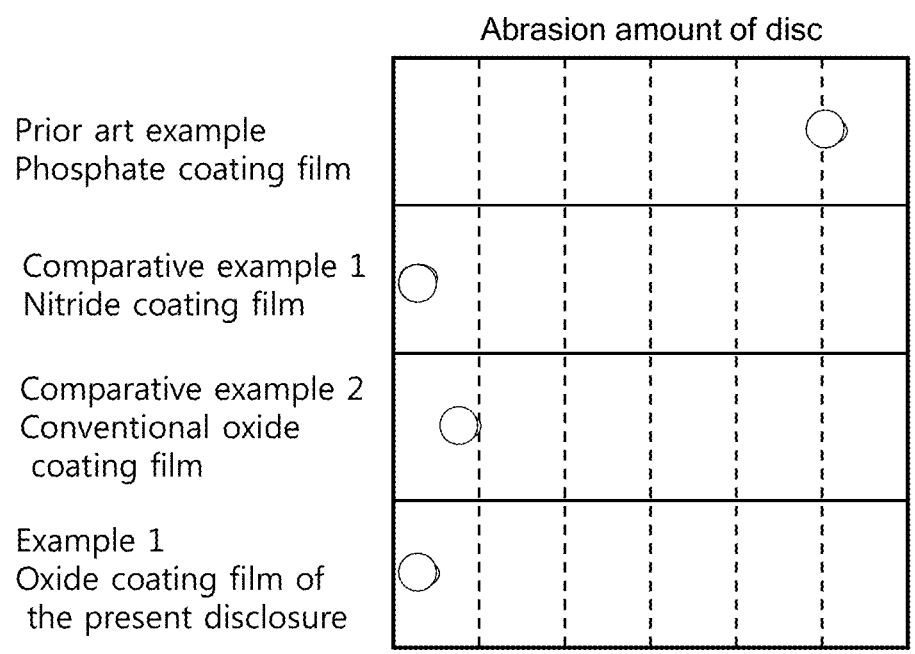
FIG. 7 is a view showing the abrasion amounts of discs in conjunction with the oxide coating film according to Embodiment 1, after a ring on disc abrasion test is conducted.
Figure 8:
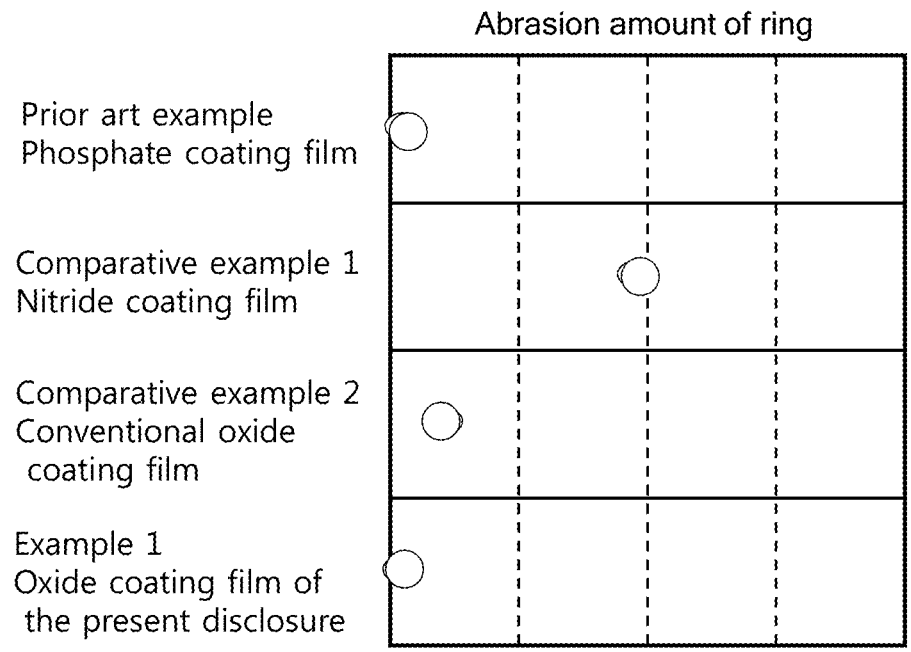
FIG. 8 is a view showing the abrasion amounts of rings in conjunction with the oxide coating film according to Embodiment 1, after the ring on disc abrasion test is conducted.

FIG. 7 shows a result of the ring on disc abrasion test and shows the abrasion amounts of the slide surfaces of the discs as the evaluation samples. FIG. 8 shows a result of the ring on disc abrasion test and shows the abrasion amounts of the rings as the other members.

Initially, comparison will be made for the abrasion amounts of the surfaces (slide surfaces) of the discs as the evaluation samples. As shown in FIG. 7, the abrasion amounts of the surfaces of the discs were less in the surface treatment films of Example 1, Comparative Example 1, and Comparative Example 2 than in the phosphate coating film of Prior Art Example 1. From this, it was found out that the surface treatment films of Example 1, Comparative Example 1, and Comparative Example 2 had good abrasion resistances. However, it was found out that regarding the surface treatment film (general oxide coating film) of Comparative Example 2, containing triiron tetraoxide ($Fe_3O_4$) single portion, several portions of the surface of the disc were peeled from the interface with the base material.

Then, comparison will be made for the abrasion amounts of the surfaces (slide surfaces) of the rings as the other members (sliding between the evaluation sample and the other member occurred), with reference to FIG. 8. The abrasion amount of the surface of the ring corresponding to the surface treatment film of Example 1, namely, the oxide coating film 160 according to Embodiment 1 was almost equal to that of the phosphate coating film of Prior Art Example 1. In contrast, it was observed that the abrasion amounts of the surfaces of the rings corresponding to the gas nitride coating film of Comparative example 1, and the general oxide coating film of Comparative example 2 were more than those of Example 1 and Prior Art Example 1. From these results, it was found out that the attacking characteristic of the oxide coating film 160 according to Embodiment 1 with respect to the other member was less as in the general phosphate coating film.

As should be understood from the above, the abrasions of the disc and the ring, corresponding to only Example 1 including the oxide coating film 170 according to the present disclosure were not substantially observed. Thus, it was found out that the oxide coating film 170 according to the present disclosure had favorable abrasion resistance and attacking characteristic.

The abrasion resistance of the oxide coating film 160 will be discussed. Since the oxide coating film 160 is the iron oxidation product, the oxide coating film 160 is very chemically stable compared to the conventional phosphate coating film. In addition, the coating film of the iron oxidation product has a hardness higher than that of the phosphate coating film. By forming the oxide coating film 160 on the slide surface, generation, adhesion, or the like of abrasion powder can be effectively prevented. As a result, the increase in the abrasion amount of the oxide coating film 160 can be effectively avoided.

Next, the attacking characteristic of the oxide coating film 160 with respect to the other member will be discussed. The outermost portion 160a of the oxide coating film 160 includes the composition A portion. The composition A portion contains diiron trioxide ($Fe_2O_3$) which is more in quantity than other substances. Therefore, the composition A portion can suppress the attacking characteristic of the oxide coating film 160 with respect to the other member, and improve the conformability of the slide surface, for the reasons stated below.

The crystal structure of diiron trioxide ($Fe_2O_3$) which is the major component of the composition A portion is rhombohedral crystal. The crystal structure of triiron tetraoxide ($Fe_3O_4$) is cubical crystal. The crystal structure of the nitride coating film is hexagonal close-packed crystals, face-centered cubical crystals, and body-centered tetragonal crystals. For this reason, diiron trioxide ($Fe_2O_3$) is flexible (or weak) in the crystal structure compared to triiron tetraoxide ($Fe_3O_4$) or the nitride coating film. Therefore, the outermost portion 160a as the composition A portion has a low hardness in the particle (grain) level.

The composition A portion containing much diiron trioxide ($Fe_2O_3$) has a hardness in grain (particle) level lower than that of the gas nitride coating film of Comparative Example 1 or the general coating film (triiron tetraoxide ($Fe_3O_4$) single portion coating film) of Comparative Example 2. Therefore, the oxide coating film 160 of Example 1 can effectively suppress the attacking characteristic with respect to the other member and improve the conformability of the slide surface, compared to the surface treatment film of Comparative Example 1 or the surface treatment film of Comparative Example 2.

Although in the ring on disc abrasion test of Embodiment 1, the test was conducted in a state in which the disc was provided with the oxide coating film, the same effects can be obtained by providing the oxide coating film on the ring. The evaluation method of the abrasion resistance of the oxide coating film is not limited to the ring on disc abrasion test, and another test method may be used.

Example 2

Next, a device reliability test was conducted on the refrigerant compressor 100 including the crankshaft 108 provided with the oxide coating film 160 according to Embodiment 1 to confirm the advantages of the oxide coating film 160. The refrigerant compressor 100 has the configuration of FIG. 1 as described above, which will not be described in repetition. In the device reliability test, as in the above-described Example 1, or the like, R134a refrigerant and ester oil with VG3 (viscosity grade at 40 degrees C. was 3 mm²/s) were used. To accelerate the abrasion of the main shaft section 109 of the crankshaft 108, the refrigerant compressor 100 was operated in a high-temperature high-load intermittent operation mode in which operation (running) and stopping of the refrigerant compressor 100 were repeated under a high-temperature state.

After the device reliability test was finished, the refrigerant compressor 100 was disassembled, the crankshaft 108 was taken out, and the slide surface of the crankshaft 108 was checked. Based on a result of the observation of the slide surface, evaluation of the device reliability test was conducted.

Figure 9:
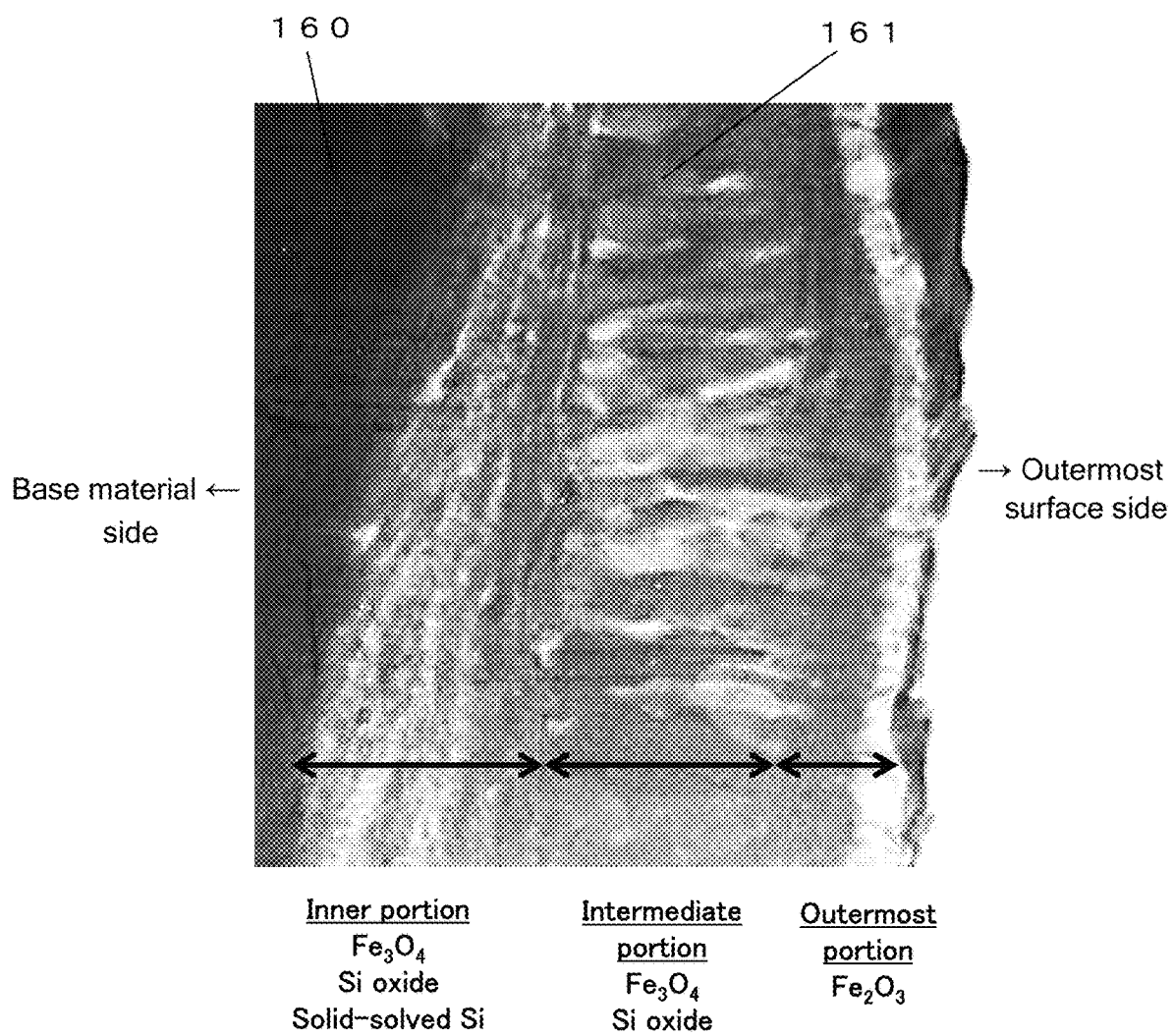
FIG. 9 is a TEM (transmission electron microscope) image showing an example of a result of TEM observation performed for the oxide coating film according to Embodiment 1, after a reliability test is conducted.

FIG. 9 shows a result of a TEM (transmission electron microscope) image obtained by TEM observation performed for the cross-section of a region that is in the vicinity of the slide surface of the crankshaft 108, after the device reliability test was conducted. As shown in FIG. 9, in the cross-section of a region that is in the vicinity of the slide surface, the oxide coating film 160 was formed on the base material 161 (on the right side of the base material 161) made of gray cast iron (FC cast iron). After the device reliability test was conducted, it was confirmed that the oxide coating film 160 had a three-portion structure including the outermost portion 160a, the intermediate portion 160b, and the inner portion 160c, and the states of these portions were not changed.

Based on the result of Example 1 and Example 2, consideration will be given to the fact that the oxide coating film 160 including the outermost portion 160a (composition A portion), the intermediate portion 160b (composition B portion), and the inner portion 160c (composition C portion) can obtain advantages.

As can be clearly seen from the above-described result of the ring on disc abrasion test (result of Example 1), the outermost portion 160a (composition A portion) contains diiron trioxide ($Fe_2O_3$) as a major component. The crystal structure of diiron trioxide ($Fe_2O_3$) is flexible in the crystal structure, compared to triiron tetraoxide ($Fe_3O_4$) or the nitride coating film. Therefore, the oxide coating film 160 including the outermost portion 160a can effectively suppress the attacking characteristic with respect to the other member (sliding between the slide member provided with the oxide coating film 160 and the other member occurred) and improve the conformability of the slide surface, as described above.

As can be clearly seen from the result of the device reliability test (result of Example 2), the abrasion of the oxide coating film 160 was not observed after the device reliability test. From this, the abrasion resistance of the oxide coating film 160 is high in practical use. It is considered that the outermost portion 160a (composition A portion) of the oxide coating film 160 can improve the abrasion resistance.

One of physical properties (characteristics) which are directly related to the abrasion, of the surface treatment film of the slide member, is hardness. The hardness of diiron trioxide ($Fe_2O_3$) which is a major component of the outermost portion 160a is about 537Hv. In contrast, the hardness of triiron tetraoxide ($Fe_3O_4$) which is a major component of the conventional general oxide coating film is about 420Hv. Thus, the hardness of diiron trioxide ($Fe_2O_3$) is higher than that of triiron tetraoxide ($Fe_3O_4$). From this, it is estimated that the oxide coating film 160 of Example 1 has in an outermost surface thereof a portion (outermost portion 160a) having a higher abrasion resistance than the general oxide coating film (triiron tetraoxide ($Fe_3O_4$) single portion coating film) of Comparative Example 2.

The intermediate portion 160b and the inner portion 160c contain the silicon (si) compound. Generally, the silicon (Si) compound has a hardness higher than that of the general iron oxidation product. Therefore, it is estimated that even in a case where the outermost portion 160a is abraded, the intermediate portion 160b and the inner portion 160c have a higher abrasion resistance than the conventional general oxide coating film (triiron tetraoxide ($Fe_3O_4$) single portion coating film of Comparative Example 2).

The oxide coating film 160 has higher adhesivity to the base material 161 (iron-based material) than the conventional general oxide coating film. It is presumed that a cause of improved adhesivity (bearing force) of the oxide coating film 160 is as follows.

For example, in Kobe Steel, Ltd Technical Report Vol. 1.55 (No. 1 Apr. 2005), it is recited that (1) the oxide coating film (scaling) is generated on the surface of a steel plate in a hot rolling step of an iron/steel material, and (2) descaling characteristic reduces as the amount of silicon contained in the iron/steel material increases. These recitations suggest that an oxide product containing silicon and iron can improve the adhesivity of the oxide coating film onto the surface of the iron-based material.

The oxide coating film 160 of Example 1 includes the intermediate portion 160b as the underlayer of the outermost portion 160a, and the inner portion 160c as the underlayer of the intermediate portion 160b. The intermediate portion 160b is the composition B portion. The inner portion 160c is the composition C portion. It is considered that the composition B portion and the composition C portion containing the silicon (Si) compound can improve the adhesivity to the base material 161, of the oxide coating film 160 including the outermost portion 160a. The inner portion 160c which is the composition C portion contains silicon which is more in quantity than that of the composition B portion. Since the portion containing the silicon (Si) compound is provided and the content of silicon in the region of the oxide coating film 160 which is closer to the base material 161, is high, the adhesive force of the oxide coating film 160 can be further improved. As a result, the bearing force of the oxide coating film 160 with respect to a load during sliding is improved, and thus peeling of the oxide coating film 160 is effectively prevented.

As described above, the composition C portion which is the inner portion 160c may include solid-solved silicon (Si) portion as elemental substances, as well as the silicon (Si) compound. It is expected that the solid-solved silicon (Si) portion can improve the adhesivity of the oxide coating film 160. The solid-solved silicon (Si) portion can be present in a localized region of the intermediate portion 160b (composition B portion) as well as the inner portion 160c (composition C portion), by setting conditions. This can improve the mutual adhesivity between the portions. Therefore, the advantages similar to the above-described advantages can be obtained, or more advantages can be obtained.

Modification, Etc.

In Embodiment 1, the sealed container 101 reserves therein the lubricating oil 103, accommodates therein the electric component 106 and the compression component 107 which is driven by the electric component 106 and compresses the refrigerant, at least one slide member included in the compression component 107 comprises the iron-based material, and the oxide coating film 160 including the composition A portion, the composition B portion, and the composition C portion is provided on the slide surface of this iron-based material.

The composition A portion of the oxide coating film 160 contains $Fe_2O_3$ which is more in quantity than other substances. The composition B portion of the oxide coating film 160 contains triiron tetraoxide ($Fe_3O_4$) which is more in quantity than other substances. The composition B portion also contains the silicon (Si) compound and may contain the solid-solved silicon (Si) portion. The composition C portion of the oxide coating film 160 contains triiron tetraoxide ($Fe_3O_4$) which is more in quantity than other substances, and contains silicon which is more in quantity than that of the composition B portion. For example, the composition C portion may contain the silicon (Si) compound and the solid-solved silicon (Si) portion. Or, the composition C portion may contain the silicon (Si) compound and may not contain the solid-solved silicon (Si) portion.

By forming the oxide coating film 160 on the slide surface of the slide member, the abrasion resistance of the slide member is improved, and the adhesivity of the oxide coating film 160 (the bearing force of the oxide coating film 160) to the base material 161 is improved. Since a sliding loss in the slide section can be reduced, reliability, efficiency and performance of the refrigerant compressor 200 can be improved.

The silicon (Si) compound of the present disclosure is not limited to the silicon oxidation product such as silicon dioxide ($SiO_2$), or silicate salt such as fayalite ($Fe_2SiO_4$) and means a compound containing silicon in a chemical structure. Further, the silicon (Si) compound of the present disclosure includes a state in which silicon enters a region between crystal lattices formed by other elements. Therefore, the silicon (Si) compound of the present disclosure is not intended to define its molecular state. The silicon (Si) compound of the present disclosure is defined as a compound including silicon, or inorganic composition including silicon in its structure. Therefore, the silicon (Si) compound of the present disclosure can also be expressed as "silicon composition".

Although the thickness of the oxide coating film 160 is about 2 µm in Embodiment 1, the thickness of the oxide coating film 160 is not limited to this. Typically, the thickness of the oxide coating film 160 may be in a range of 1 to 5 µm. In a case where the thickness of the oxide coating film 160 is less than 1 µm, it is difficult for the oxide coating film 160 to maintain the characteristic such as the abrasion resistance over a long period of time, depending on the condition. On the other hand, in a case where the thickness of the oxide coating film 160 is more than 5 µm, surface roughness of the slide surface becomes excess depending on the conditions. Therefore, in some cases, it is difficult to control accuracy of the slide sections constituted by the plurality of slide members.

Although gray cast iron is used as the base material 161 in Embodiment 1, the material of the base material 161 is not limited to this. The specific structure of the base material 161 provided with the oxide coating film 160 is not particularly limited so long as it is the iron-based material. Typically, cast iron is suitably used as the base material 161, and the iron-based material is not limited to the cast iron. The base material 161 may be a steel material, a sintered material, or other iron-based materials. Also, the specific kind of the cast iron is not particularly limited, and may be gray cast iron (cast iron, FC cast iron) as described above, spherical graphite cast iron (FCD cast iron) or other cast irons.

Commonly, gray cast iron contains about 2% silicon. The content of silicon of the base material 161 is not particularly limited. In a case where the iron-based material contains silicon, the adhesivity of the oxide coating film 160 can be improved in some cases. In general, the cast iron contains about 1 to 3% silicon. Therefore, for example, spherical graphite cast iron (FCD cast iron) can be used as the base material 161. Commonly, the steel material or the sintered material does not substantially contain silicon, or the content of silicon of the steel material or the sintered material is lower than that of the cast iron. About 0.5 to 10% silicon may be added to the steel material or the sintered material. This makes it possible to obtain advantages similar to those in a case where the cast iron is used as the base material 161.

The state of the surface of the base material 161 on which the oxide coating film 160 is formed, namely, the slide surface, is not particularly limited. Typically, the surface of the base material 161 is the polished surface. However, the surface of the base material 161 may be an unpolished surface or a surface having been subjected to a known surface treatment before the oxidation, depending on the kind of the base material 161, the kind of the slide member, or the like.

Although in Embodiment 1, R134a is used as the refrigerant, the kind of the refrigerant is not limited to this. Although in Embodiment 1, the ester oil is used as the lubricating oil 103, the kind of the lubricating oil 103 is not limited to this. Known refrigerant and lubricating oil may be suitably used as combinations of the refrigerant and the lubricating oil 103.

Suitable combinations of the refrigerant and the lubricating oil 103 are, for example, three examples described below. By using these combinations, high efficiency and reliability of the refrigerant compressor 100 can be achieved as in Embodiment 1.

In an example of combination 1, R134a, another HFC-based refrigerant, or HFC-based mixed refrigerant is used as the refrigerant, and ester oil, alkylbenzene oil, polyvinyl ether, polyalkylene glycol, or mixed oil including any of ester oil, alkylbenzene oil, polyvinyl ether, and polyalkylene glycol may be used as the lubricating oil 103.

In an example of combination 2, natural refrigerant such as R600a, R290, or R744, or mixed refrigerant including any of the natural refrigerants is used as the refrigerant, and one of mineral oil, ester oil, alkylbenzene oil, polyvinyl ether, and polyalkylene glycol, or mixed oil including any of mineral oil, ester oil, alkylbenzene oil, polyvinyl ether, and polyalkylene glycol may be used as the lubricating oil 103.

In an example of combination 3, HFO-based refrigerant such as R1234yf or mixed refrigerant of HFO-based refrigerants is used as the refrigerant, and one of ester oil, alkylbenzene oil, polyvinyl ether, and polyalkylene glycol, or mixed oil including any of ester oil, alkylbenzene oil, polyvinyl ether, and polyalkylene glycol may be used as the lubricating oil 103.

Among the above-described combinations, the combination 2 or 3 can suppress global warming by use of the refrigerant which produces less greenhouse effect. In the combination 3, a group of the lubricating oil 103 may further include mineral oil.

Although in Embodiment 1, the refrigerant compressor 100 is the reciprocating refrigerant compressor as described above, the refrigerant compressor of the present disclosure is not limited to the reciprocating refrigerant compressor, and is applicable to other compressors, such as a rotary refrigerant compressor, a scroll refrigerant compressor, or a vibrational refrigerant compressor. The refrigerant compressor to which the present disclosure is applicable can obtain advantages similar to those of Embodiment 1 so long as it has a known configuration including the slide sections, discharge valves, others.

Although in Embodiment 1, the refrigerant compressor 100 is driven by the power supply utility, the refrigerant compressor according to the present disclosure is not limited to this, and may be inverter-driven at any one of a plurality of operating frequencies. By forming the oxide coating film 160 having the above-described configuration on the slide surface of the slide section included in the refrigerant compressor which is inverter-driven at any one of a plurality of operating frequencies, the abrasion resistance of the slide member can be increased, and the bearing force of the oxide coating film 160 (adhesivity of the oxide coating film 160 to the base material 161) can be increased. This makes it possible to improve reliability of the refrigerant compressor even during a low-speed operation (running) in which the oil is not sufficiently fed to the slide sections, or during a high-speed operation (running) in which the rotational speed of the electric component increases.

Embodiment 2

In Embodiment 1 described above, as a preferable example, the oxide coating film 160 includes the composition A portion, the composition B portion, and the composition C portion, and the composition A portion substantially contains diiron trioxide ($Fe_2O_3$). The present disclosure is not limited to this. In Embodiment 2, the composition A portion contains the silicon (Si) compound or the like. This will be described specifically.

[Configuration of Refrigerant Compressor]

Figure 10:
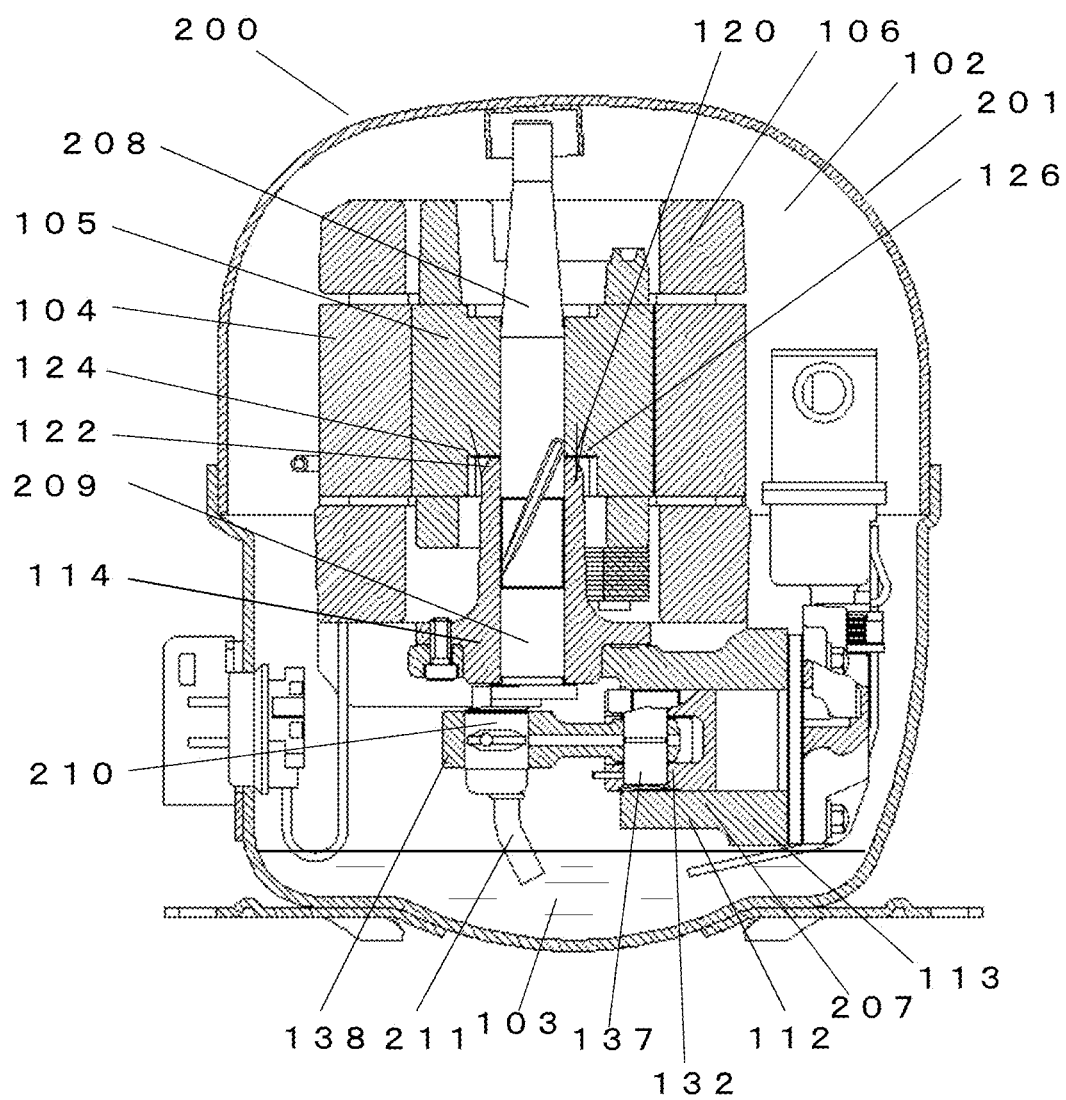
FIG. 10 is a schematic cross-sectional view of a refrigerant compressor according to Embodiment 2 of the present disclosure.
Figure 11A:
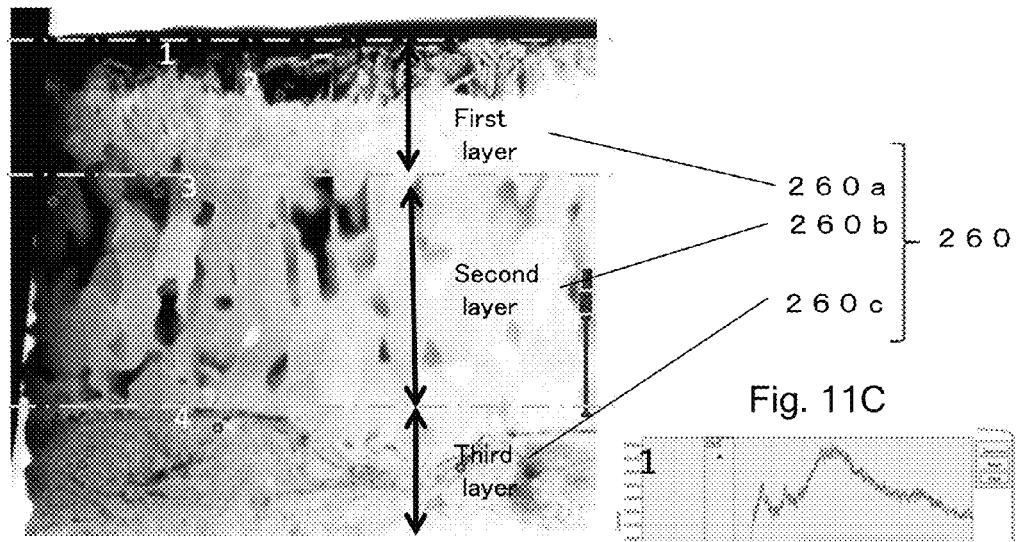
FIG. 11A is a TEM (transmission electron microscope) image showing an example of a result of TEM observation performed for an oxide coating film according to Embodiment 2 of the present disclosure.

Initially, a typical example of a refrigerant compressor according to Embodiment 2 will be specifically described with reference to FIGS. 10 and 11A. FIG. 10 is a cross-sectional view of a refrigerant compressor 200 according to Embodiment 2. FIG. 11A is a TEM (transmission electron microscope) image showing an example of a result of TEM observation performed for the cross-section of an oxide coating film 260.

As shown in FIG. 10, in the refrigerant compressor 200, a refrigerant gas 102 comprising R134a is filled inside a sealed container 201, and ester oil as lubricating oil 103 is reserved in the bottom portion of the sealed container 201. Inside the sealed container 201, an electric component 106 including a stator 104 and a rotor 105, and a reciprocating compression component 207 configured to be driven by the electric component 106 are accommodated.

The compression component 207 includes a crankshaft 208, a cylinder block 112, a piston 132, and the like. The configuration of the compression component 207 will be described below.

The crankshaft 208 includes at least a main shaft section 209 to which the rotor 105 is pressingly secured, and an eccentric shaft 210 which is provided eccentrically with the main shaft section 209. An oil feeding pump 211 is provided at the lower end of the crankshaft 208 and is in communication with the lubricating oil 103. The crankshaft 208 comprises base material 261 made of gray cast iron (FC cast iron) containing about 2% silicon (Si), and the oxide coating film 260 provided on a surface of the base material 261.

The cylinder block 112 comprises cast iron. The cylinder block 112 is formed with a bore 113 with a substantially cylindrical shape, and includes a bearing section 114 supporting the main shaft section 209.

The rotor 105 is provided with a flange surface 120. The upper end surface of the bearing section 114 is a thrust surface 122. A thrust washer 124 is disposed between the flange surface 120 and the thrust surface 122 of the bearing section 114. The flange surface 120, the thrust surface 122, and the thrust washer 124 constitute a thrust bearing 126.

The piston 132 is loosely fitted into the bore 113 with a clearance. The piston 132 comprises an iron-based material. The piston 132 forms a compression chamber 134 together with the bore 113. The piston 132 is coupled to the eccentric shaft 110 via a connecting rod 138 as a coupling means by use of a piston pin 137. The end surface of the bore 113 is closed by a valve plate 139.

A head 140 constitutes a high-pressure chamber. The head 140 is secured to the valve plate 139 on a side opposite to the bore 113. A suction tube (not shown) is secured to the sealed container 201 and connected to a low-pressure side (not shown) of a refrigeration cycle. The suction tube leads the refrigerant gas 102 to the inside of the sealed container 201. A suction muffler 142 is retained between the valve plate 139 and the head 140.

The operation of the refrigerant compressor 200 configured as described above will be described below.

Electric power supplied from a power supply utility (not shown) is supplied to the electric component 106, and rotates the rotor 105 of the electric component 106. The rotor 105 rotates the crankshaft 208. An eccentric motion of the eccentric shaft 210 is transmitted to the piston 132 via the connecting rod 138 as the coupling means and the piston pin 137, and drives the piston 132. The piston 132 reciprocates inside the bore 113. The refrigerant gas 102 led to the inside of the sealed container 201 through the suction tube (not shown) is suctioned from the suction muffler 142, and is compressed inside the compression chamber 134.

According to the rotation of the crankshaft 208, the lubricating oil 103 is fed to slide sections by the oil feeding pump 211. The lubricating oil 103 lubricates the slide sections and seals the clearance between the piston 132 and the bore 113.

In recent years, to provide higher efficiency of the refrigerant compressor 200, for example, (1) lubricating oil with a lower viscosity is used as the lubricating oil 103 as described above, or (2) the slide length of the slide sections (a distance for which the slide sections slide) is designed to be shorter. For this reason, slide conditions are getting more harsh. Specifically, there is a tendency that the oil film formed between the slide sections is thinner, or difficult to form.

In addition to the above, in the refrigerant compressor 200, the eccentric shaft 210 of the crankshaft 208 is provided eccentrically with the bearing section 114 of the cylinder block 112, and the main shaft section 209 of the crankshaft 208. In this layout, a fluctuating (variable) load which causes a load fluctuation (change) is applied to regions between the main shaft section 209 of the crankshaft 208, the eccentric shaft 210 and the connecting rod 138, due to a gas pressure of the compressed refrigerant gas 102. With the load fluctuation (change), the refrigerant gas 102 dissolved into the lubricating oil 103 is evaporated into bubbles in repetition, in, for example, the region between the main shaft section 209 and the bearing section 114. In this way, the bubbles are generated in the lubricating oil 103.

For the above-described reasons, for example, in the slide sections of the main shaft section 209 of the crankshaft 208 and the bearing section 114, the oil film has run out, and the metals of the slide surfaces contact each other more frequently.

However, the slide section of the refrigerant compressor 200, for example, the slide section of the crankshaft 208 as an example of Embodiment 2 comprises the oxide coating film 260 having the above-described configuration (see FIG. 11A). For this reason, even if the oil film has run out more frequently, the abrasion of the slide surface caused by this can be suppressed over a long period of time.

[Configuration of Oxide Coating Film]

Figure 11B:
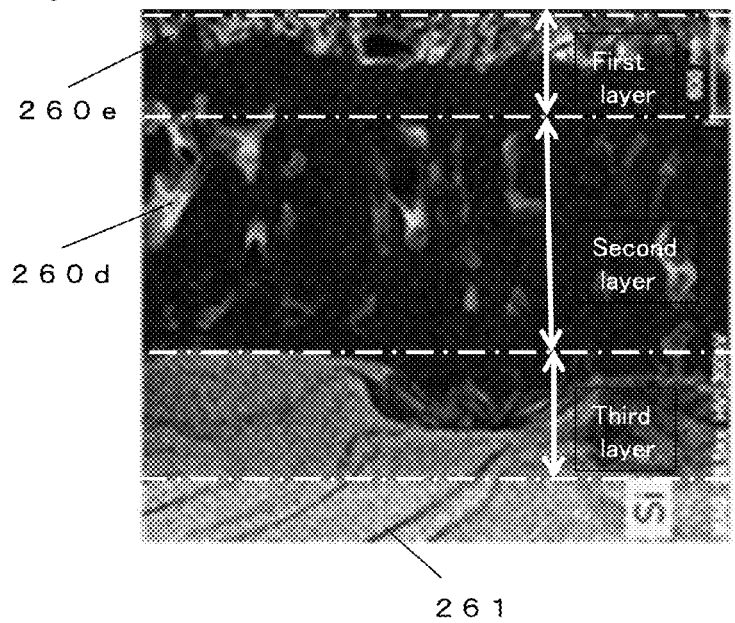
FIG. 11B is an element map showing an example of a result of EDS analysis performed for the oxide coating film of FIG. 11A.
Figure 11C:
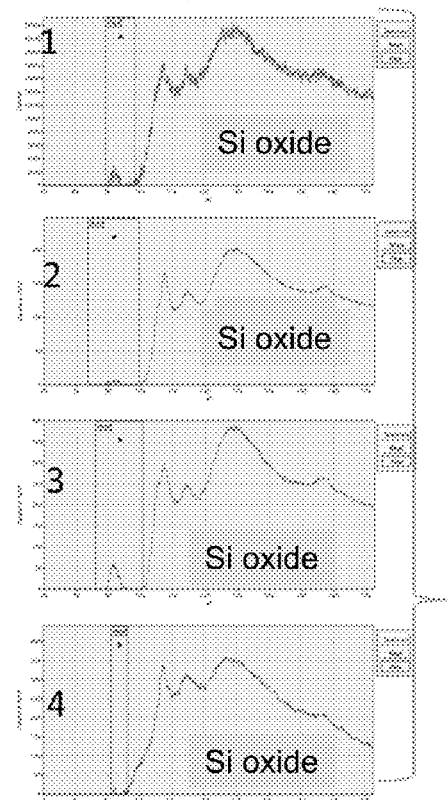
FIG. 11C is a view of analysis showing an example of a result of the EELS analysis performed for the oxide coating film of FIG. 11A or 11B.

Next, the oxide coating film 260 according to Embodiment 2 which is provided on the slide section will be described in more detail with reference to FIGS. 11A to 11C. FIG. 11A is the TEM (transmission electron microscope) image showing a result of the TEM observation performed for the cross-section of the oxide coating film 260. FIG. 11B shows a result of element mapping of EDS analysis performed for the cross-section of the oxide coating film 260 of FIG. 11A. FIG. 11C is a view showing a result of the EELS analysis performed for the cross-section of the oxide coating film 260 of FIG. 11A.

In Embodiment 2, the crankshaft 208 comprises a base material 261 which is gray cast iron (FC cast iron). The oxide coating film 260 is provided on the surface of the base material 261. As in Embodiment 1, specifically, for example, the slide surface of the base material 261 is subjected to polishing finish, and then the oxide coating film 260 is formed by oxidation by use of an oxidation gas.

As described above, as shown in FIG. 11A, in Embodiment 2, the oxide coating film 260 is formed on the base material 261 (not shown). It is clearly observed that the oxide coating film 260 according to Embodiment 2 has a three-portion structure (three-layer structure) including the outermost portion 260a (first layer), the intermediate portion 260b (second layer), and the inner portion 260c (third layer), the outermost portion 260a, the intermediate portion 260b, and the inner portion 260c being arranged in this order from the outermost surface of the oxide coating film 260, as described above.

The outermost portion 260a is the composition A portion containing diiron trioxide ($Fe_2O_3$) which is more in quantity than other substances, as in the outermost portion 160a according to Embodiment 1. The intermediate portion 260b is the composition B portion containing triiron tetraoxide ($Fe_3O_4$) which is more in quantity than other substances and containing the silicon (Si) compound, as in the intermediate portion 160b according to Embodiment 1. The inner portion 260c is the composition C portion containing triiron tetraoxide ($Fe_3O_4$) which is more in quantity than other substances, and containing silicon which is more in quantity than that of the composition B portion, as in the inner portion 160c according to Embodiment 1.

Next, the concentration of silicon (Si) contained in the oxide coating film 260 will be described with reference to FIGS. 11B and 11C. As described above, FIG. 11B shows a result of element mapping of silicon (Si) corresponding to the oxide coating film 260 of FIG. 11A. FIG. 11B shows the concentration ratio of silicon (Si) by contrasting density of black and white. As the color of the image is brighter, the ratio of silicon (Si) is higher. In the example of FIGS. 11A and 11B, the thickness of the oxide coating film 260 is about 2.5 µm. Boundaries of the outermost portion 260a, the intermediate portion 260b, and the inner portion 260c of the oxide coating film 260 are indicated by dot-and-dash lines.

From the results of the element analysis, as shown in FIG. 11B, the silicon (Si) concentration of the base material 261 is high, and the silicon (Si) concentration of the inner portion 260c of the oxide coating film 260 which is closer to the base material 261 is high. In contrast, in the interface between the inner portion 260c and the intermediate portion 260b, the silicon (Si) concentration is significantly reduced.

As in the white portion 160d of the intermediate portion 160b according to Embodiment 1, a white portion 260d is present in the intermediate portion 260b. In a region corresponding to the white portion 260d, as shown in FIG. 11B, the silicon (Si) concentration is increased. Silicon (Si) in the outermost portion 160a according to Embodiment 1 was not substantially observed. As shown in FIG. 11B, it is observed that in Embodiment 2, the white portion 260e is present in the outermost portion 260a. It is observed that the silicon (Si) concentration in a region corresponding to the white portion 260e is increased.

FIG. 11C shows EELS waveforms of regions corresponding to regions indicated by numbers 1-4 in FIG. 11A. From the results of analysis for silicon (Si) of the oxide coating film 260, these EELS waveforms indicate that in the oxide coating film 260, silicon (Si) bonded to oxygen (O) is present in these regions. It can be seen that in the oxide coating film 260, the silicon (Si) compound such as silicon dioxide ($SiO_2$) is present in the outermost portion 260a (e.g., region indicated by 1 and 2 in FIGS. 11A and 11C) in addition to the inner portion 260c (e.g., region indicated by 4 in FIGS. 11A and 11C), and the intermediate portion 260b (e.g., region indicated by 3 in FIGS. 11A and 11C).

The results of analysis for iron (Fe) and oxygen (O) of the oxide coating film 260 are similar to those of the oxide coating film 160 according to Embodiment 1, although this is not described in Embodiment 2.

Therefore, in the oxide coating film 260 according to Embodiment 2, the white portion 260e is present in the outermost portion 260a, and the silicon (Si) compound is present in the white portion 260e.

Next, consideration will be given to the fact that the oxide coating film 260 according to Embodiment 2 can obtain advantages because it includes the outermost portion 260a (composition A portion), the intermediate portion 260b (composition B portion), and the inner portion 260c (composition C portion), and the outermost portion 260a (composition A portion) contains at least the silicon (Si) compound.

As described in Embodiment 1, the outermost portion 260a (composition A portion) contains diiron trioxide ($Fe_2O_3$) as a major component. The crystal structure of diiron trioxide ($Fe_2O_3$) is flexible in the crystal structure, compared to triiron tetraoxide ($Fe_3O_4$) or the nitride coating film. Therefore, the oxide coating film 260 including the outermost portion 260a can effectively suppress the attacking characteristic with respect to the other member (sliding between the slide member provided with the oxide coating film 260 and the other member occurs) and improve the conformability of the slide surface, as described above. In addition, as described in Embodiment 1, the outermost portion 260a (composition A portion) of the oxide coating film 260 can improve the abrasion resistance of the oxide coating film 260.

The intermediate portion 260b and the inner portion 260c contain the silicon (Si) compound. As described in Embodiment 1, generally, the silicon (Si) compound has a hardness higher than that of the iron oxidation product. Therefore, it is estimated that even in a case where the outermost portion 260a is abraded, the intermediate portion 260b and the inner portion 260c have a high abrasion resistance. As described in Embodiment 1, the oxide coating film 260 has higher adhesivity (bearing force) to the base material 261 (iron-based material) than the conventional general oxide coating film.

In the oxide coating film 260 according to Embodiment 2, the outermost portion 260a contains the silicon (Si) compound with a hardness higher than that of the iron oxidation product. It is considered that this silicon (Si) compound contributes to suppressing the abrasion of the outermost portion 260a. It is estimated that since the oxide coating film 260 includes the outermost portion 260a containing the silicon (Si) compound, it can have a higher abrasion resistance.

In Embodiment 2, as described above, the inner portion 260c (composition C portion) may include solid-solved silicon (Si) portion as elemental substances, as well as the silicon (Si) compound. It is expected that the solid-solved silicon (Si) portion can improve the adhesivity of the oxide coating film 260. The solid-solved silicon (Si) portion can be present in a localized region of the intermediate portion 260b (composition B portion) or the outermost portion 260a (composition A portion) as well as the inner portion 260c (composition C portion), by setting conditions. This can improve the mutual adhesivity between the portions. Therefore, the advantages similar to the above-described advantages can be obtained, or more advantages can be obtained.

In Embodiment 2, the sealed container 201 reserves therein the lubricating oil 103, accommodates therein the electric component 106 and the compression component 207 which is driven by the electric component 106 and compresses the refrigerant, at least one slide member included in the compression component 207 comprises the iron-based material, and the oxide coating film 160 including the composition A portion, the composition B portion, and the composition C portion is provided on the slide surface of this iron-based material.

The composition A portion of the oxide coating film 260 contains diiron trioxide ($Fe_2O_3$) which is more in quantity than other substances, and may contain the silicon (Si) compound or the solid-solved silicon (Si) portion. The composition B portion of the oxide coating film 260 contains triiron tetraoxide ($Fe_3O_4$) which is more in quantity than other substances. The composition B portion contains the silicon (Si) compound and may contain the solid-solved silicon (Si) portion. The composition C portion of the oxide coating film 260 contains triiron tetraoxide ($Fe_3O_4$) which is more in quantity than other substances, and contains silicon which is more in quantity than that of the composition B portion. For example, the composition C portion may contain the silicon (Si) compound and the solid-solved silicon (Si) portion. Or, the composition C portion may contain the silicon (Si) compound and may not contain the solid-solved silicon (Si) portion.

By forming the oxide coating film 260 on the slide surface of the slide member, the abrasion resistance of the slide member is improved, and the adhesivity of the oxide coating film 260 (the bearing force of the oxide coating film 260) to the base material 261 is improved. In Embodiment 2, the silicon (Si) compound is present in the outermost portion 260a which is the composition A portion. Since the composition A portion is located in the outermost portion of the slide surface, the slide surface can have a high abrasion resistance just after the slide operation of the slide section has started. This makes it possible to effectively suppress start-up failure such as twist, which is likely to occur at re-start-up, when the refrigerant compressor 200 is operated intermittently.

Embodiment 3

In Embodiment 3, an example of a refrigeration (freezing) device including the refrigerant compressor 100 of Embodiment 1 or the refrigerant compressor 200 of Embodiment 2 will be specifically described with reference to FIG. 12.

Figure 12:
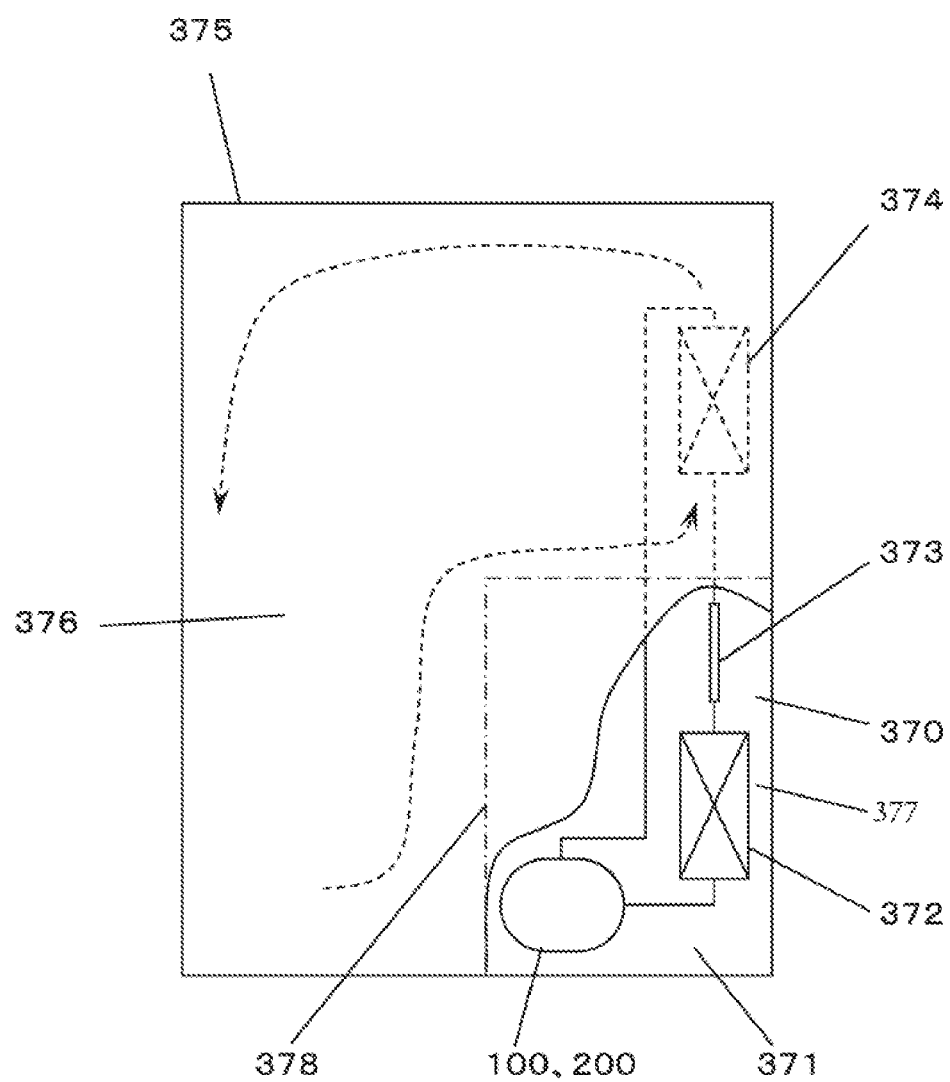
FIG. 12 is a schematic view of a refrigeration device according to Embodiment 3 of the present disclosure.
Figure 13:
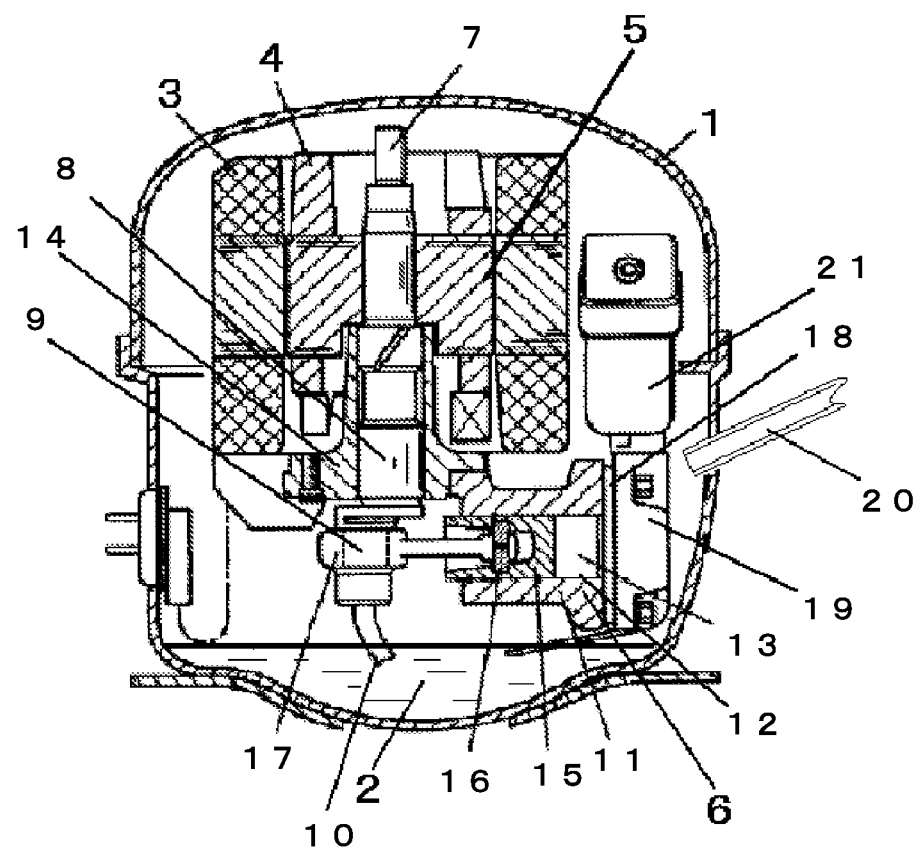
FIG. 13 is a schematic cross-sectional view of a conventional refrigerant compressor.

FIG. 12 is a schematic view of a refrigeration device including the refrigerant compressor 100 according to Embodiment 1 or the refrigerant compressor 200 according to Embodiment 2. In Embodiment 3, only the schematic basic configuration of the refrigeration device will be described.

As shown in FIG. 12, the refrigeration device according to Embodiment 3 includes a body 375, a partition wall 378, a refrigerant circuit 370, and the like. The body 375 is formed by, for example, a heat insulating casing and doors. A surface of the casing opens and the doors are provided to open and close the opening of the casing. The inside of the body 375 is divided by the partition wall 378 into an article storage space 376 and a mechanical room 377. Inside the storage space 376, a blower (not shown) is provided. Alternatively, the inside of the body 375 may be divided into spaces other than the storage space 376 and the mechanical room 377.

The refrigerant circuit 370 is configured to cool the inside of the storage space 376. The refrigerant circuit 370 includes, for example, the refrigerant compressor 100 of Embodiment 1, a heat radiator 372, a pressure reducing unit 373, and a heat absorber 374 which are annularly coupled to each other by pipes. The heat absorber 374 is disposed in the storage space 376. Cooling heat of the heat absorber 374 is agitated by the blower (not shown) and circulated through the inside of the storage space 376 as indicated by broken-line arrows shown in FIG. 12. In this way, the inside of the storage space 376 is cooled.

The refrigerant compressor 100 included in the refrigerant circuit 370 includes the slide member made of the iron-based material, and the oxide coating film 160 is formed on the slide surface of this slide member, as described in Embodiment 1. Instead of the refrigerant compressor 100, the refrigerant circuit 370 may include the refrigerant compressor 200 of Embodiment 2. The refrigerant compressor 200 includes the slide member made of the iron-based material, and the oxide coating film 260 is formed on the slide surface of this slide member, as in the refrigerant compressor 100.

As described above, the refrigeration device according to Embodiment 3 includes the refrigerant compressor 100 according to Embodiment 1 (or the refrigerant compressor 200 according to Embodiment 2). The slide section included in the refrigerant compressor 100 (or the refrigerant compressor 200) can improve the abrasion resistance of the slide member and the adhesivity (bearing force of the oxide coating film 160 or the oxide coating film 260) of the oxide coating film 160 (or the oxide coating film 260) to the base material 161 (or the base material 261). The refrigerant compressor 100 (or the refrigerant compressor 200) can reduce a sliding loss of the slide section, and achieve high reliability and high efficiency. As a result, the refrigeration device according to Embodiment 3 can reduce electric power consumption, and realize energy saving.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

INDUSTRIAL APPLICABILITY

As described above, the present invention can provide a refrigerant compressor which can obtain high reliability under a condition in which it uses lubricating oil with a low viscosity, and a refrigeration device using this refrigerant compressor. Therefore, the present invention is widely applicable to devices using refrigeration cycles.

REFERENCE SIGNS LIST 100 refrigerant compressor
101 sealed container
103 lubricating oil
106 electric component
107 compression component
108 crankshaft (slide member)
160 oxide coating film
160a outermost portion
160b intermediate portion
160c inner portion
160d white portion
161 base material
200 refrigerant compressor
201 sealed container
207 compression component
208 crankshaft (slide member)
260 oxide coating film
260a outermost portion
260b intermediate portion
260c inner portion
260d white portion
260e white portion
370 refrigerant circuit
372 heat radiator
373 pressure reducing unit
374 heat absorber

The invention claimed is:

1. A refrigerant compressor which reserves lubricating oil in a sealed container, and accommodates therein an electric component, and a compression component which is driven by the electric component and compresses a refrigerant,
   wherein at least one of slide members included in the compression component is made of an iron-based material, and
   wherein an oxide coating film is provided on a slide surface of the iron-based material,
   the oxide coating film comprising:
   a composition A portion containing diiron trioxide ($Fe_2O_3$) which is more in quantity than other substances;
   a composition B portion containing triiron tetraoxide ($Fe_3O_4$) which is more in quantity than other substances and containing a silicon (Si) compound; and
   a composition C portion containing triiron tetraoxide ($Fe_3O_4$) which is more in quantity than other substances and containing silicon (Si) which is more in quantity than silicon (Si) of the composition B portion, and
   the oxide coating film comprising at least an outermost portion that is the composition A portion, an intermediate portion that is the composition B portion, and an inner portion that is the composition C portion, the outermost portion, the intermediate portion, and the inner portion being arranged in this order from an outermost surface of the oxide coating film.

2. The refrigerant compressor according to claim 1, wherein the oxide coating film is provided on a surface of a base material made of the iron-based material, and
   wherein the composition A portion contains a silicon (Si) compound.

3. The refrigerant compressor according to claim 1, wherein at least one of the silicon (Si) compound contained in the composition B portion or a silicon compound contained in the composition C portion is at least one of silicon dioxide ($SiO_2$) and fayalite ($Fe_2SiO_4$).

4. The refrigerant compressor according to claim 1, wherein the oxide coating film has a thickness in a range of 1 to 5 μm.

5. The refrigerant compressor according to claim 1, wherein the iron-based material contains 0.5 to 10% silicon.

6. The refrigerant compressor according to claim 5, wherein the iron-based material is cast iron.

7. The refrigerant compressor according to claim 1, wherein the refrigerant is a HFC-based refrigerant such as R134a, or a mixed refrigerant of the HFC-based refrigerant, and the lubricating oil is one of ester oil, alkylbenzene oil, polyvinyl ether, and polyalkylene glycol, or mixed oil including any of ester oil, alkylbenzene oil, polyvinyl ether, and polyalkylene glycol.

8. The refrigerant compressor according to claim 1, wherein the refrigerant is a natural refrigerant such as R600a, R290, or 8744, or a mixed refrigerant including any of natural refrigerants, and the lubricating oil is one of mineral oil, ester oil, alkylbenzene oil, polyvinyl ether, and polyalkylene glycol, or mixed oil including any of mineral oil, ester oil, alkylbenzene oil, polyvinyl ether, and polyalkylene glycol.

9. The refrigerant compressor according to claim 1, wherein the refrigerant is a HFO-based refrigerant such as R1234yf, or a mixed refrigerant of the HFO-based refrigerant, and the lubricating oil is one of ester oil, alkylbenzene oil, polyvinyl ether, and polyalkylene glycol, or mixed oil including any of ester oil, alkylbenzene oil, polyvinyl ether, and polyalkylene glycol.

10. The refrigerant compressor according to claim 1, wherein the electric component is inverter-driven at one of a plurality of operating frequencies.

11. A refrigeration device comprising:
a refrigerant circuit including the refrigerant compressor according to claim 1, a heat radiator, a pressure reducing unit, and a heat absorber, which are annularly coupled to each other via a pipe.

* * * * *